(12) United States Patent
Kurata

(10) Patent No.: US 10,137,827 B2
(45) Date of Patent: Nov. 27, 2018

(54) POSITION LIGHTING DEVICE

(71) Applicant: SUZUKI MOTOR CORPORATION, Hamamatsu-shi, Shizuoka (JP)

(72) Inventor: Koji Kurata, Hamamatsu (JP)

(73) Assignee: SUZUKI MOTOR CORPORATION, Shizuoka (JP)

(*) Notice: Subject to any disclaimer, the term of this patent is extended or adjusted under 35 U.S.C. 154(b) by 0 days.

(21) Appl. No.: 15/595,402

(22) Filed: May 15, 2017

(65) Prior Publication Data

US 2017/0355300 A1 Dec. 14, 2017

(30) Foreign Application Priority Data

Jun. 10, 2016 (JP) .................................. 2016-116542

(51) Int. Cl.
*B60Q 1/30* (2006.01)
*B60Q 1/00* (2006.01)
*G06K 9/00* (2006.01)

(52) U.S. Cl.
CPC ............. *B60Q 1/30* (2013.01); *B60Q 1/0023* (2013.01); *G06K 9/00825* (2013.01); *B60Q 2300/43* (2013.01)

(58) Field of Classification Search
CPC .... B60Q 1/0023; B60Q 1/30; B60Q 2300/43; G06K 9/00825
See application file for complete search history.

(56) References Cited

U.S. PATENT DOCUMENTS 3,949,362 A * 4/1976 Doyle .................... B60Q 1/525
340/435
4,249,160 A * 2/1981 Chilvers .............. B60Q 1/0023
250/206

FOREIGN PATENT DOCUMENTS

JP S 63-213203 A 9/1988
JP 2013-60128 A 4/2013

* cited by examiner

*Primary Examiner* — Karabi Guharay
(74) *Attorney, Agent, or Firm* — Stein IP, LLC

(57) ABSTRACT

There is provided a position lighting device configured to emit at least one road irradiation beam from a vehicle onto a road, thereby making the other moving object which is positioned behind the vehicle or at a side of the vehicle recognize an existence of the vehicle. A lighting unit is configured to emit the at least one road irradiation beam onto at least a portion of areas on the road behind and at the side of the vehicle. A distance detecting unit is configured to detect a distance between the vehicle and the other moving object. A lighting control unit is configured to control the lighting unit on the basis of the distance between the vehicle and the other moving object detected by the distance detecting unit, thereby changing a state of the at least one road irradiation beam.

12 Claims, 11 Drawing Sheets

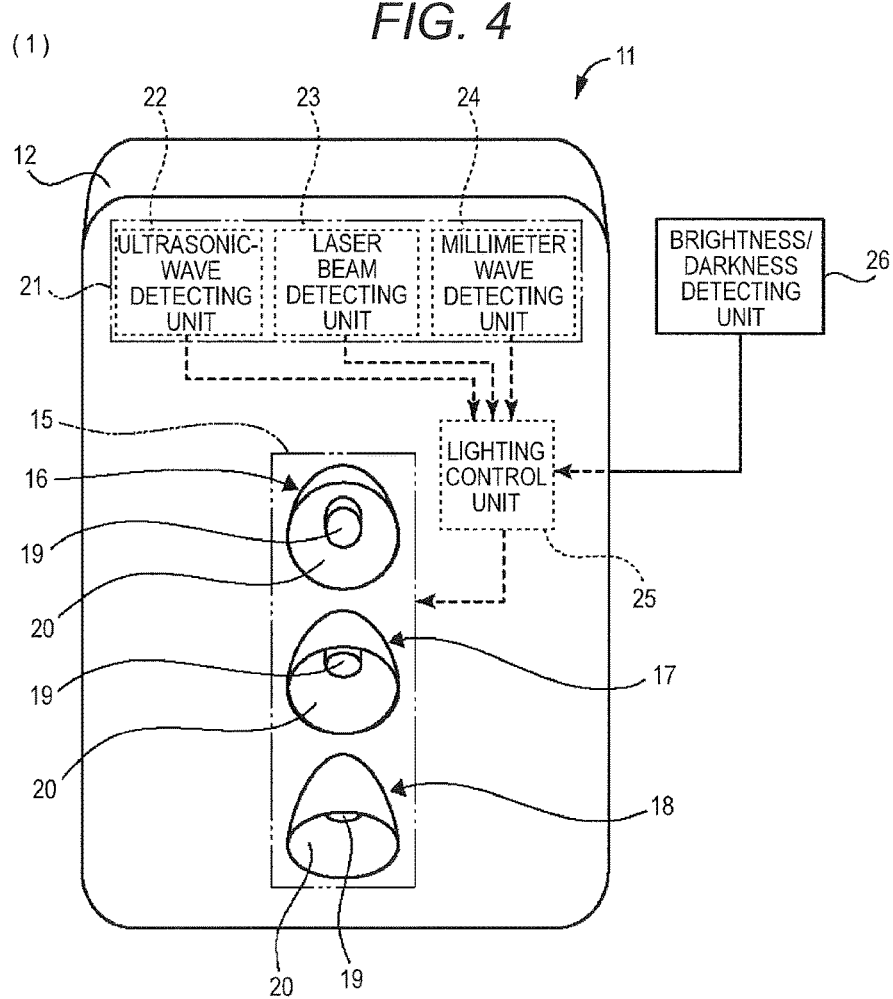
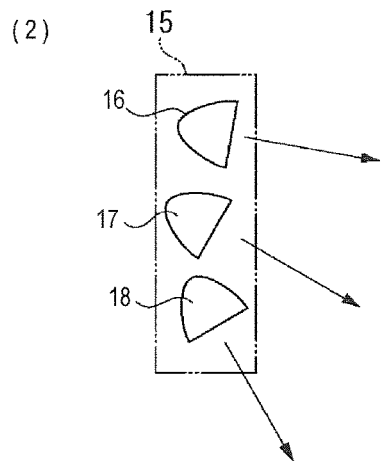
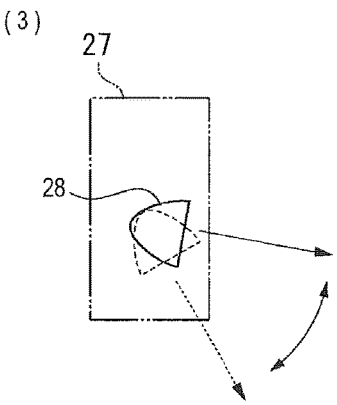
FIG. 4

FIG. 8
(1)
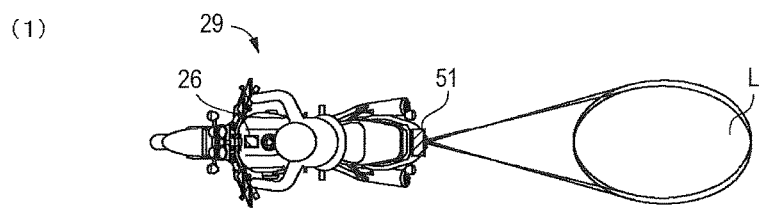
(2)
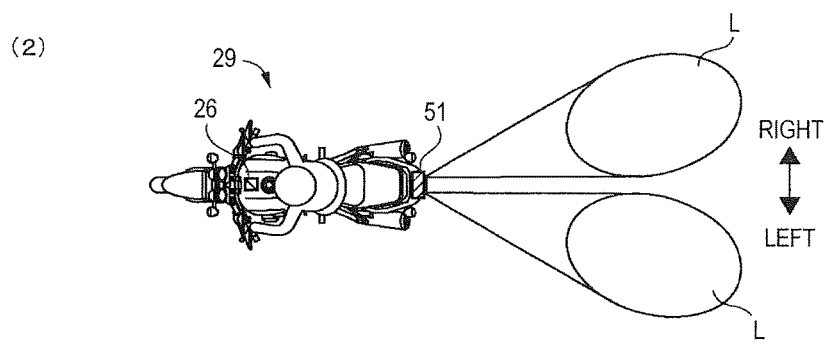
(3)
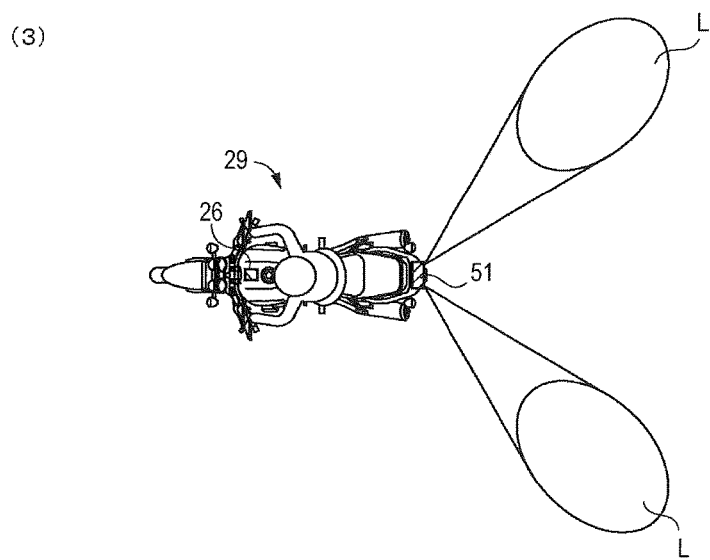

FIG. 9
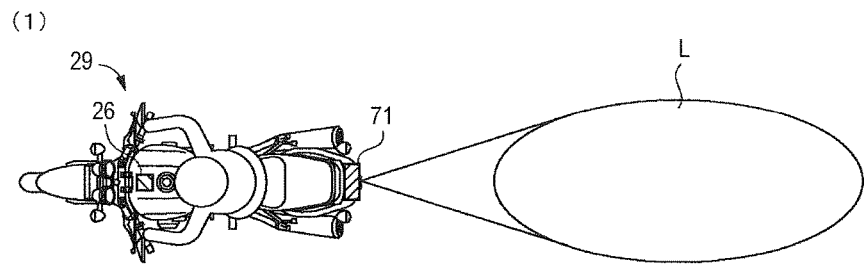
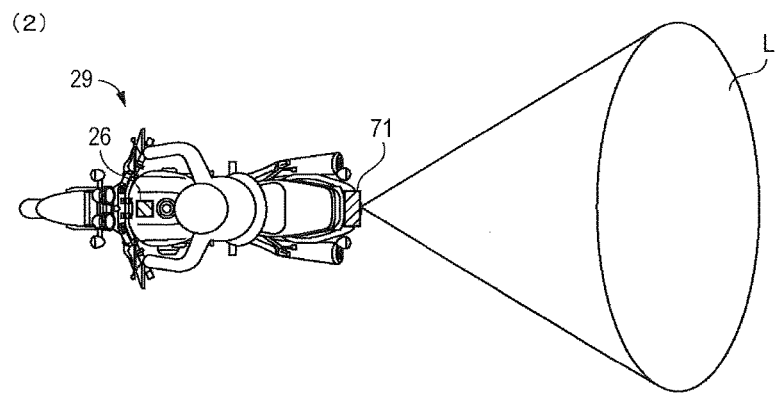
FIG. 10
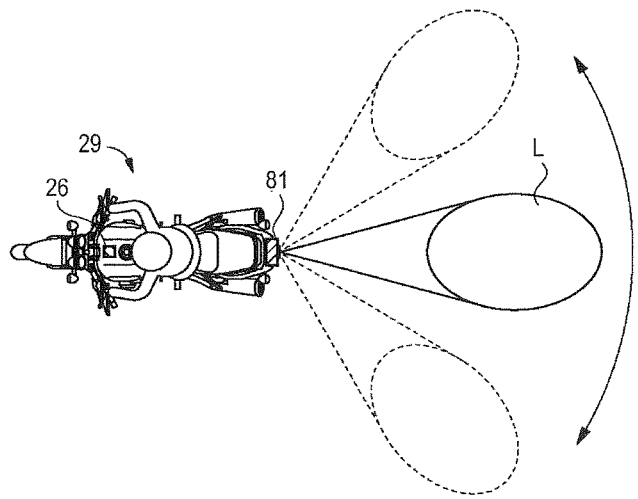

FIG. 12
(1)
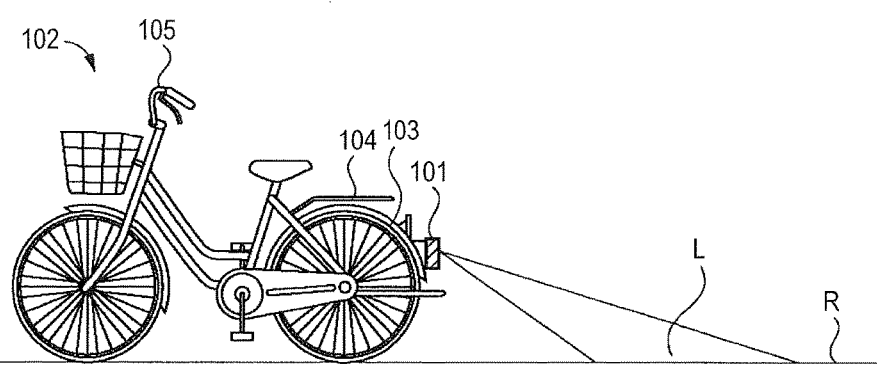
(2)
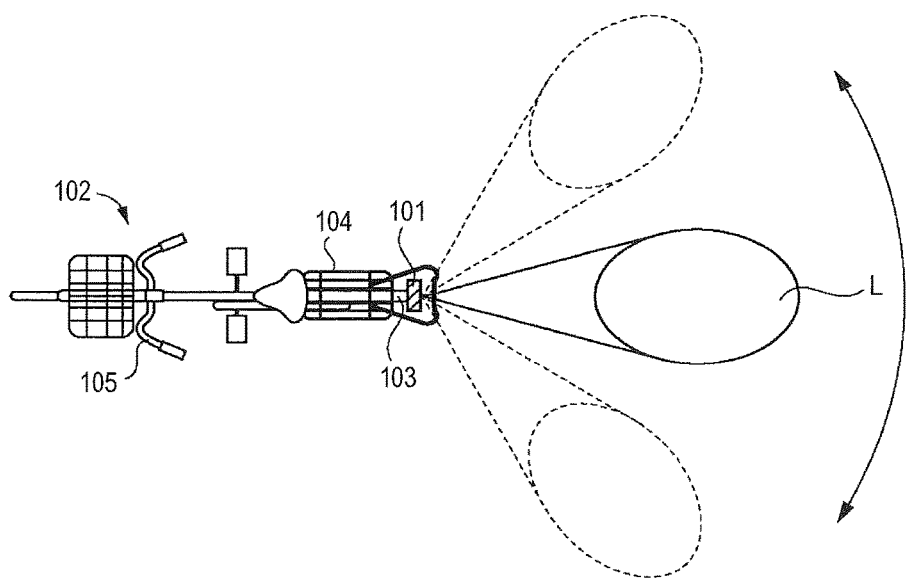

FIG. 13
(1)
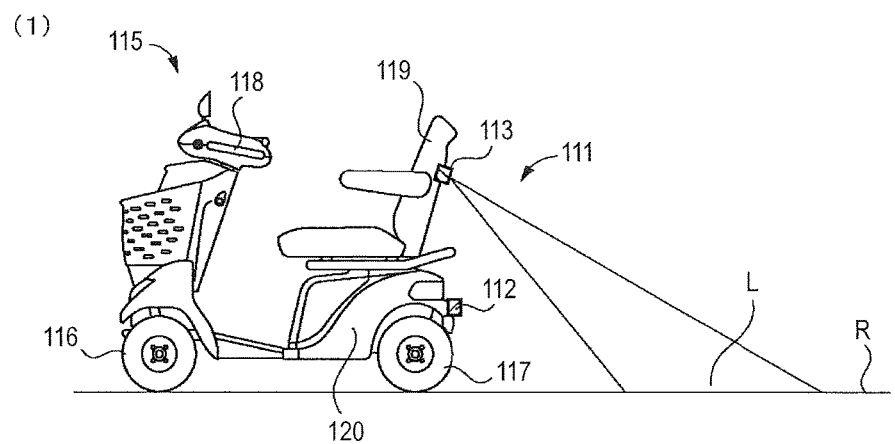
(2)
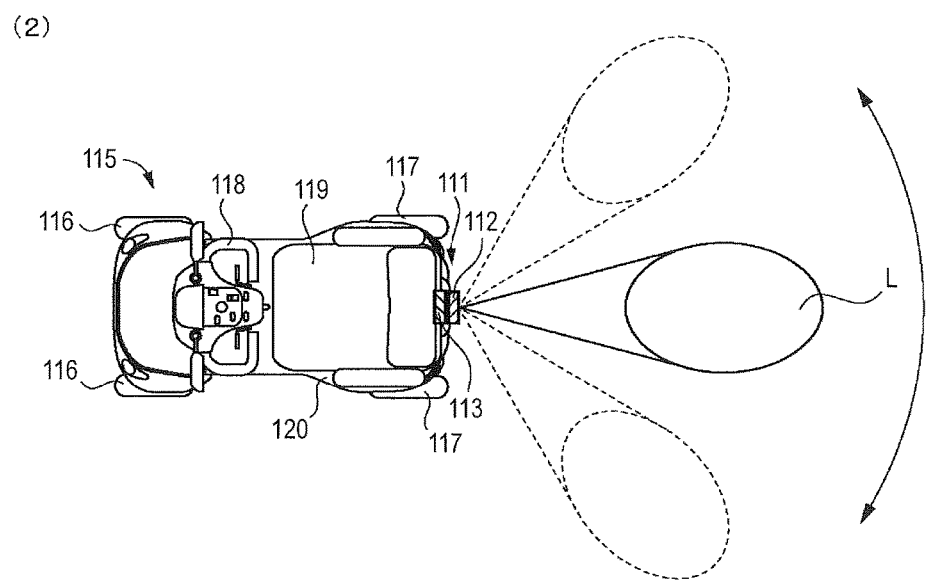

POSITION LIGHTING DEVICE

CROSS-REFERENCE TO RELATED APPLICATIONS

The disclosure of Japanese Patent Application No. 2016-116542 filed on Jun. 10, 2016, including specification, drawings and claims is incorporated herein by reference in its entirety.

TECHNICAL FIELD

The present invention relates to a position lighting device configured to emit a beam from a vehicle onto the road such that the other moving object can recognize the existence of the vehicle.

BACKGROUND

In general, vehicles such as motorcycles and automobiles have tail lamps. In a case where two vehicles are running in the darkness, the preceding vehicle can emit beams from the tail lamps such that the driver of the following vehicle can recognize the existence of the preceding vehicle. However, in conditions of poor visibility due to rain, fog, or the like, even if the preceding vehicle emits the beams from the tail lamps, the driver of the following vehicle is likely to miss those beams, and to recognize the existence of the front-vehicle flag too late.

With respect to this problem, there is a technology for emitting beams from a lighting device of a vehicle onto an area of the road behind or at the side of the vehicle. According to this technology, the preceding vehicle emits the beams from the lighting device onto the area of the road behind or at the side of the preceding vehicle such that the emitted beams are reflected from the road, and if the driver of the following vehicle see those reflected beams, the driver can more clearly recognize the existence of the preceding vehicle, as compared to the case of seeing beams emitted from tail lamps. Hereinafter, beams which are emitted onto an area of the road around a vehicle will be referred to as "road irradiation beams".

Patent Document 1 discloses a device usable as a device for emitting the road irradiation beams.

Patent Document 1: Japanese Patent Application Publication No. S63-213203A

However, in a case where a preceding vehicle always emits a constant road irradiation beam, sometimes it may be difficult for the driver of the following vehicle to recognize the existence of the preceding vehicle on the basis of the road irradiation beams, depending on the distance between the preceding vehicle and the following vehicle.

For example, in a case where the following vehicle comes very close to the preceding vehicle, even if beams emitted onto an area of the road behind the preceding vehicle are reflected from the road, the reflected beams are significantly deviated downward from the center of the field of view of the driver of the following vehicle. As a result, it may become difficult for the driver of the following vehicle to recognize the road irradiation beams and recognize the existence of the preceding vehicle on the basis of the road irradiation beams.

Meanwhile, in a case where the road irradiation beams are emitted onto positions on an area the road right behind the preceding vehicle, if the following vehicle is positioned far from the preceding vehicle, the reflected beams of the road irradiation beams from the road to enter the eyes of the driver of the following vehicle weaken. As a result, it may be difficult for the driver of the following vehicle to recognize the existence of the preceding vehicle on the basis of the road irradiation beams.

SUMMARY

It is therefore an object of the present invention to provide a position lighting device capable of emitting a road irradiation beam from a vehicle on the basis of the distances from the vehicle and the other moving object, such that other moving object can appropriately recognize the existence of the vehicle on the basis of the road irradiation beam.

According to an aspect of the embodiments of the present invention, there is provided a position lighting device configured to emit at least one road irradiation beam from a vehicle onto a road, thereby making the other moving object which is positioned behind the vehicle or at a side of the vehicle recognize an existence of the vehicle, the position lighting device comprising: a lighting unit configured to emit the at least one road irradiation beam onto at least a portion of areas on the road behind and at the side of the vehicle; a distance detecting unit configured to detect a distance between the vehicle and the other moving object; and a lighting control unit configured to control the lighting unit on the basis of the distance between the vehicle and the other moving object detected by the distance detecting unit, thereby changing a state of the at least one road irradiation beams.

According to the present invention, it is possible to emit the road irradiation beam from the vehicle on the basis of the distances between the vehicle and the other moving object such that other moving object can appropriately recognize the existence of the vehicle.

BRIEF DESCRIPTION OF THE DRAWINGS

In the accompanying drawings:

FIG. 4 is an explanatory view illustrating the configuration of the position lighting device according to the first embodiment of the present invention;

FIG. 8 is an explanatory view illustrating the number, irradiation positions, and so on of the road irradiation beams which can be emitted from the position lighting device according to the second embodiment of the present invention;

FIG. 9 is an explanatory view illustrating the shapes of the road irradiation beams which can be emitted from a position lighting device according to a third embodiment of the present invention;

FIG. 10 is an explanatory view illustrating swinging of the road irradiation beam which can be emitted from a position lighting device according to a fourth embodiment of the present invention;

FIG. 12 is an explanatory view illustrating a sixth embodiment of the present invention (an example in which the present invention is applied to a bicycle); and FIG. 13 is an explanatory view illustrating a seventh embodiment of the present invention (an example in which the present invention is applied to a welfare-purpose electric vehicle).

DETAILED DESCRIPTION OF THE EMBODIMENTS

Figure 1:
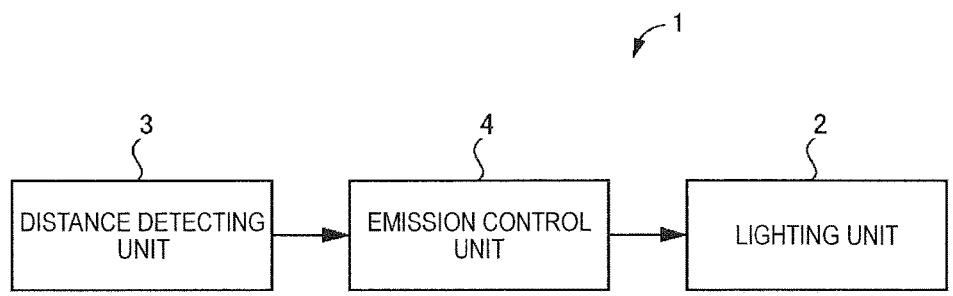
FIG. 1 is a block diagram illustrating the configuration of a position lighting device according to embodiments of the present invention.

FIG. 1 shows a position lighting device according to an embodiment of the present invention. In FIG. 1, a position lighting device 1 according to the embodiment of the present invention is configured to emit a road irradiation beam from a vehicle onto the road such that the other moving object which is positioned behind the vehicle or at the side of the vehicle can recognize the existence of the corresponding vehicle.

The position lighting device 1 is installed on the vehicle. The vehicle may be a saddle-ridden type vehicle such as a motorcycle, a scooter, a motor tricycle, or a buggy. Alternatively, the vehicle may be a bicycle. Also, the vehicle may be an electric vehicle (for example, a welfare-purpose electric one-seater vehicle which is a means of transportation for the aged and so on), or may be a four-wheeled automobile. Hereinafter, the vehicle equipped with the position lighting device 1 will be referred to as the subject vehicle. Meanwhile, the other moving objects are not limited to vehicles, and may be people such as pedestrians.

The position lighting device 1 includes a lighting unit 2, a distance detecting unit 3, and an emission control unit 4.

The lighting unit 2 emits one or more road irradiation beams onto at least one portion of areas on the road behind the subject vehicle and at the side of the subject vehicle.

The distance detecting unit 3 detects the distance between the subject vehicle and each of the other moving objects. Detection on the distance between the subject vehicle and the other moving object can be performed by specifically measuring the distance between the subject vehicle and the other moving object. Alternatively, the distance detection may be performed by setting sections according to the magnitudes of distances, such as a very short distance section, a short-to-medium distance section, and a long distance section, and recognizing which section the distance between the subject vehicle and the other moving object belongs to.

The emission control unit 4 controls the lighting unit 2 on the basis of the distance between the subject vehicle and the other moving object detected by the distance detecting unit 3, thereby changing a state of the road irradiation beam. The road irradiation beam state is the positions, irradiation ranges, sizes, shapes, number, intensity, color, or the like of the road irradiation beams on the road. Also, the road irradiation beam state may include whether to make road irradiation beams blink, and a blinking rate. Also, the road irradiation beam state may be whether to move road irradiation beams, and a movement speed. Examples of the movement include swinging and rotating.

As change in the road irradiation beam state, various forms can be considered. For example, in a case where the distance between the subject vehicle and the other moving object is relatively large, the positions of the road irradiation beams on the road may be set to be far from the subject vehicle, and in a case where the distance between the subject vehicle and the other moving object is relatively small, the positions of the road irradiation beams on the road may be set to be close to the subject vehicle. Also, in the case where the distance between the subject vehicle and the other moving object is relatively large, the shapes of the road irradiation beams on the road may be set to be elongated in the longitudinal direction of the road, and in the case where the distance between the subject vehicle and the other moving object is relatively small, the shapes of the road irradiation beams on the road may be set to be elongated in the lateral direction of the road. Also, in the case where the distance between the subject vehicle and the other moving object is relatively large, the road irradiation beams may be disposed right behind the subject vehicle, and in the case where the distance between the subject vehicle and the other moving object is relatively small, the road irradiation beams may be disposed behind the right side of the subject vehicle, behind the left side of the subject vehicle, or just beside of the subject vehicle (the left side or the right side). Also, in the case where the distance between the subject vehicle and the other moving object is relatively large, the number of the road irradiation beams on the road may be set to one, and in the case where the distance between the subject vehicle and the other moving object is relatively small, the number of the road irradiation beams on the road may be set to two or more. Also, in the case where the distance between the subject vehicle and the other moving object is relatively large, the intensity of the road irradiation beams may be set to be high, and in the case where the distance between the subject vehicle and the other moving object is relatively small, the number of the road irradiation beams may be set to be low. Also, in the case where the distance between the subject vehicle and the other moving object is relatively large, the road irradiation beams may be set to blink at intervals of a long time, and in the case where the distance between the subject vehicle and the other moving object is relatively small, the road irradiation beams may be set to blink at intervals of a short time. Also, in the case where the distance between the subject vehicle and the other moving object is relatively large, the road irradiation beams may be swung at a low speed, and in the case where the distance between the subject vehicle and the other moving object is relatively small, the road irradiation beams may be swung at a high speed.

Also, the above-described road irradiation beam state may be continually changed according to the distance between the subject vehicle and the other moving object. Also, the road irradiation beam state may be changed to two states, for example, a short distance state and a long distance state, or may be changed to multiple (three or more) states such as a very short distance state, a short distance state, a middle distance state, and a long distance state.

With the position lighting device 1 according to the embodiments of the present invention, it is possible to appropriately emit the road irradiation beam from the lighting unit 2 on the basis of the distance between the subject vehicle and the other moving object, such that the other moving object can recognize the existence of the subject vehicle.

First Embodiment

Figure 2:
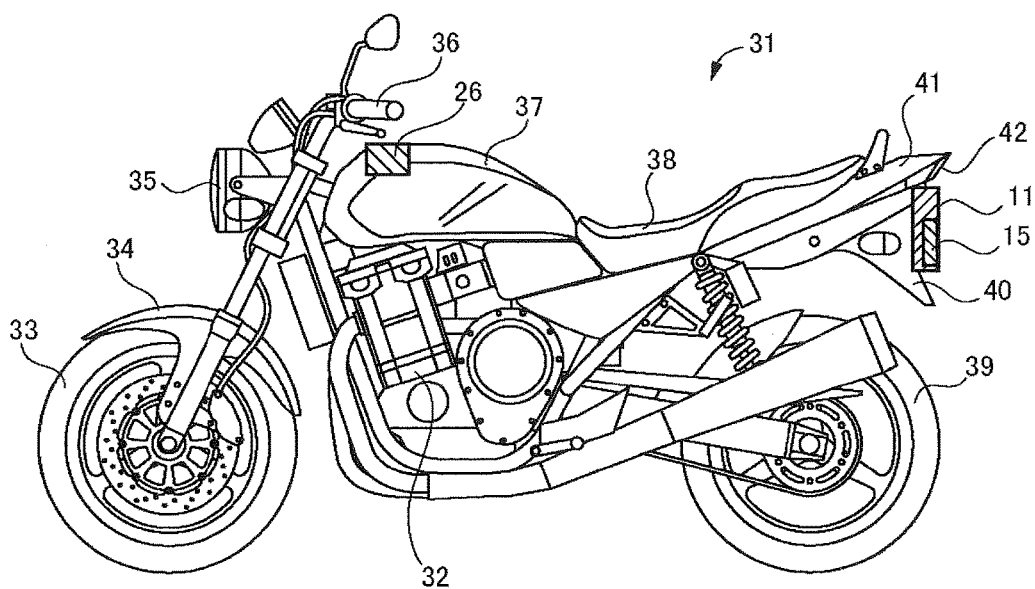
FIG. 2 is an explanatory view illustrating a motorcycle equipped with a position lighting device according to a first embodiment of the present invention.

FIGS. 2 to 6 show a first embodiment of the present invention. Among these drawings, FIG. 2 shows a motorcycle 31. The motorcycle 31 is equipped with a position lighting device 11 of the first embodiment of the present invention. As shown in FIG. 2, in the motorcycle 31, an engine 32 is installed, and in front of the engine 32, a front wheel 33, a front fender 34, a headlamp 35, and a steering handle 36 are installed. Also, above the engine 32, a fuel tank 37 and a seat 38 are installed. Also, below the engine 32, a rear wheel 39, a rear fender 40, a seat cowl 41, and a tail lamp 42 are installed.

The position lighting device 11 is disposed at the rear of the motorcycle 31. Specifically, the position lighting device 11 is attached to the upper side of the rear fender 40 of the motorcycle 31, below the tail lamp 42, or a portion of the seat cowl 41. However, a brightness/darkness detecting unit 26 included in the position lighting device 11 is disposed at a portion of the motorcycle 31 which is likely to be exposed to sunlight and is unlikely to be exposed to both of a beam emitted from the headlamp 35 and a beam emitted from the tail lamp 42. For example, the brightness/darkness detecting unit 26 is attached to the upper side of the fuel tank 37 or the like.

Figure 3:
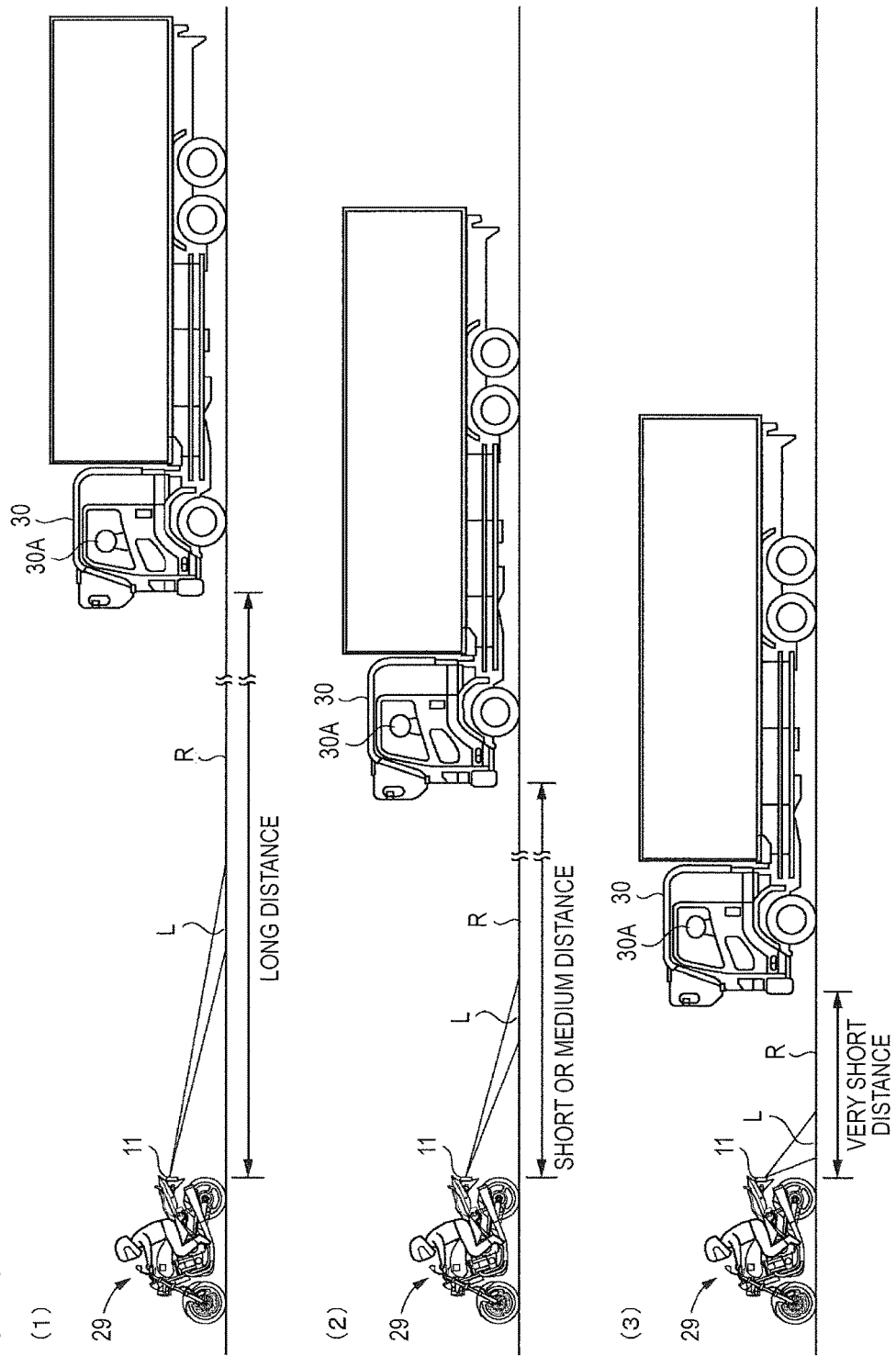
FIG. 3 is an explanatory view illustrating irradiation positions of road irradiation beams which can be emitted from the position lighting device according to the first embodiment of the present invention, and the distance between the motorcycle equipped with the position lighting device according to the first embodiment and the other moving object.

FIG. 3 shows irradiation positions of road irradiation beams L which can be emitted from the position lighting device 11, and so on. In FIG. 4, (1) shows the configuration of the position lighting device 11. In FIG. 4, (2) shows the directions of beams emitted from lamp units 16, 17, and 18 of the position lighting device 11. In FIG. 4, (3) shows a modification of a lighting unit of the position lighting device of the first embodiment of the present invention. As shown in FIG. 3, the position lighting device 11 is configured to emit a road irradiation beam L from a subject vehicle 29 onto the road R such that the other moving object 30 positioned behind or at the side of the subject vehicle 29 can recognize the existence of the subject vehicle 29. Also, in the first embodiment, the subject vehicle 29 is the motorcycle 31 equipped with the position lighting device 11. Further, the other moving object 30 is a vehicle, and is, for example, a truck as shown in FIG. 3.

As shown in (1) of FIG. 4, the position lighting device 11 includes a casing 12, a lighting unit 15, a distance detecting unit 21, a lighting control unit 25, and the brightness/darkness detecting unit 26.

The lighting unit 15 has a function of emitting a road irradiation beam L onto an area on the road R behind the subject vehicle 29. In the first embodiment, the lighting unit 15 has the three lamp units 16, 17, and 18. Each of the lamp units 16, 17, and 18 has a light source 19 and a reflector 20. Those light sources 19 are halogen lamps or light emitting diodes (LEDs) for emitting white beams. The lamp units 16, 17, and 18 are disposed inside the casing 12. Also, in a surface of the casing 12 facing the area behind the subject vehicle 29, openings (not shown in the drawings) are formed, and the lamp units 16, 17, and 18 emit beams onto positions on the road behind the subject vehicle 29, through the openings.

Also, all of the three lamp units 16, 17, and 18 are configured to emit the road irradiation beams L onto the area on the road R behind the subject vehicle 29; however, the specific irradiation positions of the road irradiation beams L are different from one another. Specifically, the lamp unit 16 emits a road irradiation beam L onto a position on the road R at a long distance behind the subject vehicle 29, as shown in (1) of FIG. 3. The lamp unit 17 emits a road irradiation beam L onto a position on the road R at a middle distance behind the subject vehicle 29 (a position closer to the subject vehicle 29 than the irradiation position of the road irradiation beam L from the lamp unit 16), as shown in (2) of FIG. 3. The lamp unit 18 emits a road irradiation beam L onto a position on the road R at a short distance behind the subject vehicle 29 (a position closer to the subject vehicle 29 than the irradiation position of the road irradiation beam L from the lamp unit 17), as shown in (3) of FIG. 3.

In other words, as shown in (2) of FIG. 4, all of the optical axes of the three lamp units 16, 17, and 18 faces the center of the right-left direction of the rear side of the subject vehicle 29 and are inclined downward to the road R; however, the specific inclination angles of the optical axes are different from one another. Specifically, among the three lamp units 16, 17, and 18, the inclination angle of the optical axis of the lamp unit 16 downward is the smallest (the optical axis is most nearly horizontal). Also, the inclination angle of the optical axis of the lamp unit 17 downward is larger than the inclination angle of the optical axis of the lamp unit 16 downward. Also, the inclination angle of the optical axis of the lamp unit 18 downward is larger than the inclination angle of the optical axis of the lamp unit 17 downward (the optical axis of the lamp unit 18 is most nearly vertical).

Also, as shown in (1) of FIG. 4, the three lamp units 16, 17, and 18 are arranged in a line in the vertical direction; however, the arrangement of the lamp units 16, 17, and 18 is not limited thereto. For example, it is possible to appropriately adjust the inclination angles of the optical axes of the lamp units 16, 17, and 18 with respect to the right-left direction and the vertical direction and arrange the lamp units 16, 17, and 18 in a line in the right-left direction.

Meanwhile, the distance detecting unit 21 has a function of detecting the distance between the subject vehicle 29 and the other moving object 30. Specifically, the distance detecting unit 21 has a function of performing detection on a plurality of types of detection waves emitted from the other moving object 30. The detection waves are waves usable to detect objects, and are, for example, an ultrasonic wave, a laser beam, a millimeter wave, and so on.

More specifically, as shown in (1) of FIG. 4, the distance detecting unit 21 includes an ultrasonic-wave detecting unit 22, a laser beam detecting unit 23, and a millimeter wave detecting unit 24. The ultrasonic-wave detecting unit 22 performs detection on the ultrasonic wave emitted from the other moving object 30. The laser beam detecting unit 23 performs detection on the laser beam emitted from the other moving object 30. The millimeter wave detecting unit 24 performs detection on the millimeter wave emitted from the other moving object 30. Also, the ultrasonic-wave detecting unit 22, the laser beam detecting unit 23, and the millimeter wave detecting unit 24 are attached to, for example, the surface of the casing 12 facing the area behind the subject vehicle 29.

The distance detecting unit can recognize the distance between the subject vehicle 29 and the other moving object 30 on the basis of the types of detection waves detected from the other moving object 30. Specifically, if the distance detecting unit detects the ultrasonic wave emitted from the other moving object 30, it can recognize that the distance between the subject vehicle 29 and the other moving object 30 is in the very short distance section. Also, if the distance detecting unit detects the laser beam emitted from the other moving object 30, it can recognize that the distance between the subject vehicle 29 and the other moving object 30 is in the short-to-medium distance section. Also, if the distance detecting unit detects the millimeter wave emitted from the other moving object 30, it can recognize that the distance between the subject vehicle 29 and the other moving object 30 is in the long distance section. For example, the very short distance section is equal to or longer than 0 m and shorter than 5 m, and the short-to-medium distance section is equal to or longer than 5 m and shorter than 20 m, and the longitudinal distances is equal to or longer than 20 m and shorter than 150 m.

Figure 5:
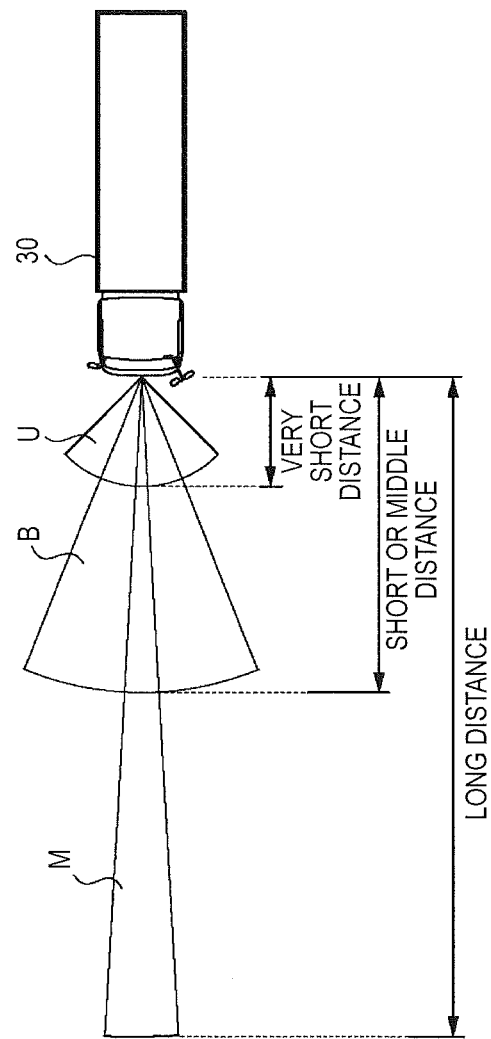
FIG. 5 is an explanatory view illustrating detection waves which can be emitted from the other moving object.

Now, a system capable of recognizing the distance between the subject vehicle 29 and the other moving object 30 on the basis of the types of detection waves detected from the other moving object 30 will be described. FIG. 5 shows the plurality of types of detection wave which can be emitted from the other moving object 30, specifically, an ultrasonic wave U, a laser beam B, and a millimeter wave M. Also, FIG. 5 shows a state of the track which is an example of the other moving object 30 as seen from above.

The other moving object 30 has a system for performing running assistance or automatic driving. Further, this system includes an ultrasonic sensor, a laser radar, a millimeter wave radar, and so on for detecting objects existing in front of or at the side of the other moving object 30. The detectable distances of general ultrasonic sensors are about 5 m. The term "detectable distance" means the maximum distance from a sensor or a radar within which the sensor or the radar can detect objects. The ultrasonic sensor can detect an object existing at a very short distance in front of the other moving object 30 by emitting the ultrasonic wave U and detecting the reflected wave of the ultrasonic wave U from the object. Also, the detectable distances of general laser radars are about 20 m. The laser radar can detect an object existing at a short or middle distance in front of the other moving object 30 by emitting the laser beam B and detecting the reflected wave of the laser beam B from the object. Also, the detectable distances of general millimeter wave radars are about 150 m. The millimeter wave radar can detect an object existing at a long distance in front of the other moving object 30 by emitting the millimeter wave M and detecting the reflected wave of the millimeter wave M from the object.

In a case where the other moving object 30 exists at a long distance behind the subject vehicle 29, the millimeter wave M emitted from the other moving object 30 reaches the subject vehicle 29. Also, in a case where the other moving object 30 exists at a short or middle distance behind the subject vehicle 29, the millimeter wave M and the laser beam B emitted from the other moving object 30 reach the subject vehicle 29 at the same time. Also, in a case where the other moving object 30 exists at a very short distance behind the subject vehicle 29, the millimeter wave M, the laser beam B, and the ultrasonic wave U emitted from the other moving object 30 reach the subject vehicle 29 at the same time. Therefore, in a case where the subject vehicle 29 detects only the millimeter wave M, on the basis that only the millimeter wave M of the detection waves has been detected, it can recognize that the distance between the subject vehicle 29 and the other moving object 30 is in the long distance section. Also, in a case where the subject vehicle 29 detects the millimeter wave M and the laser beam B at the same time, on the basis that a detection wave included in the detection waves detected at the same time and having the shortest detectable distance is the laser beam B, the subject vehicle 29 can recognize that the distance between the subject vehicle 29 and the other moving object 30 is a short or medium distance. Also, in a case where the subject vehicle 29 detects the millimeter wave M, the laser beam B, and the ultrasonic wave U at the same time, on the basis that a detection wave having the shortest detectable distance among the detection waves detected at the same time is the ultrasonic wave U, the subject vehicle 29 can recognize that the distance between the subject vehicle 29 and the other moving object 30 is a very short distance.

Meanwhile, the lighting control unit 25 has a function of changing the irradiation positions of the road irradiation beams L on the road R by controlling the lighting unit 15 on the basis of the types of detection waves detected by the distance detecting unit 21 as shown in (1) of FIG. 4. The lighting control unit 25 can be configured by an arithmetic processing device such as a micro computer. Specifically, the lighting control unit 25 is installed inside the casing 12. The lighting control unit 25 is connected to the ultrasonic-wave detecting unit 22, the laser beam detecting unit 23, and the millimeter wave detecting unit 24. Also, the lighting control unit 25 is connected to the lamp units 16, 17, and 18. If the ultrasonic-wave detecting unit 22 detects the ultrasonic wave, it outputs a detection signal to the lighting control unit 25, and if the laser beam detecting unit 23 detects the laser beam, it outputs a detection signal to the lighting control unit, and if the millimeter wave detecting unit 24 detects the millimeter wave, it outputs a detection signal to the lighting control unit. Therefore, on the basis of received detection signals, the lighting control unit 25 outputs control signals to the lamp units 16, 17, and 18, such that the three lamp units 16, 17, and 18 are independently switched between an ON state and an OFF state, whereby the irradiation positions of the road irradiation beams are changed.

Also, the lighting control unit 25 has a function of switching the distance detecting unit 21 and the lighting unit 15 between an ON state and an OFF state on the basis of the brightness of the circumference of the subject vehicle 29. Specifically, the lighting control unit 25 is connected to the brightness/darkness detecting unit 26. The brightness/darkness detecting unit 26 has a function of detecting brightness, and has, for example, a photoconductive element. The brightness/darkness detecting unit 26 outputs a detection signal according to the brightness (light intensity) of the circumference of the subject vehicle 29. By the brightness/darkness detecting unit 26, it is possible to recognize whether it is day or night, or it is possible to recognize whether the subject vehicle 29 exists in a sunless place such as the inside of a tunnel in the daytime. On the basis of the detection signal output from the brightness/darkness detecting unit 26, the lighting control unit 25 supplies or interrupts electric power for the distance detecting unit 21 and the lighting unit 15. Also, the lighting control unit 25 is a specific example of an emission control unit and a lamp control unit.

Figure 6:
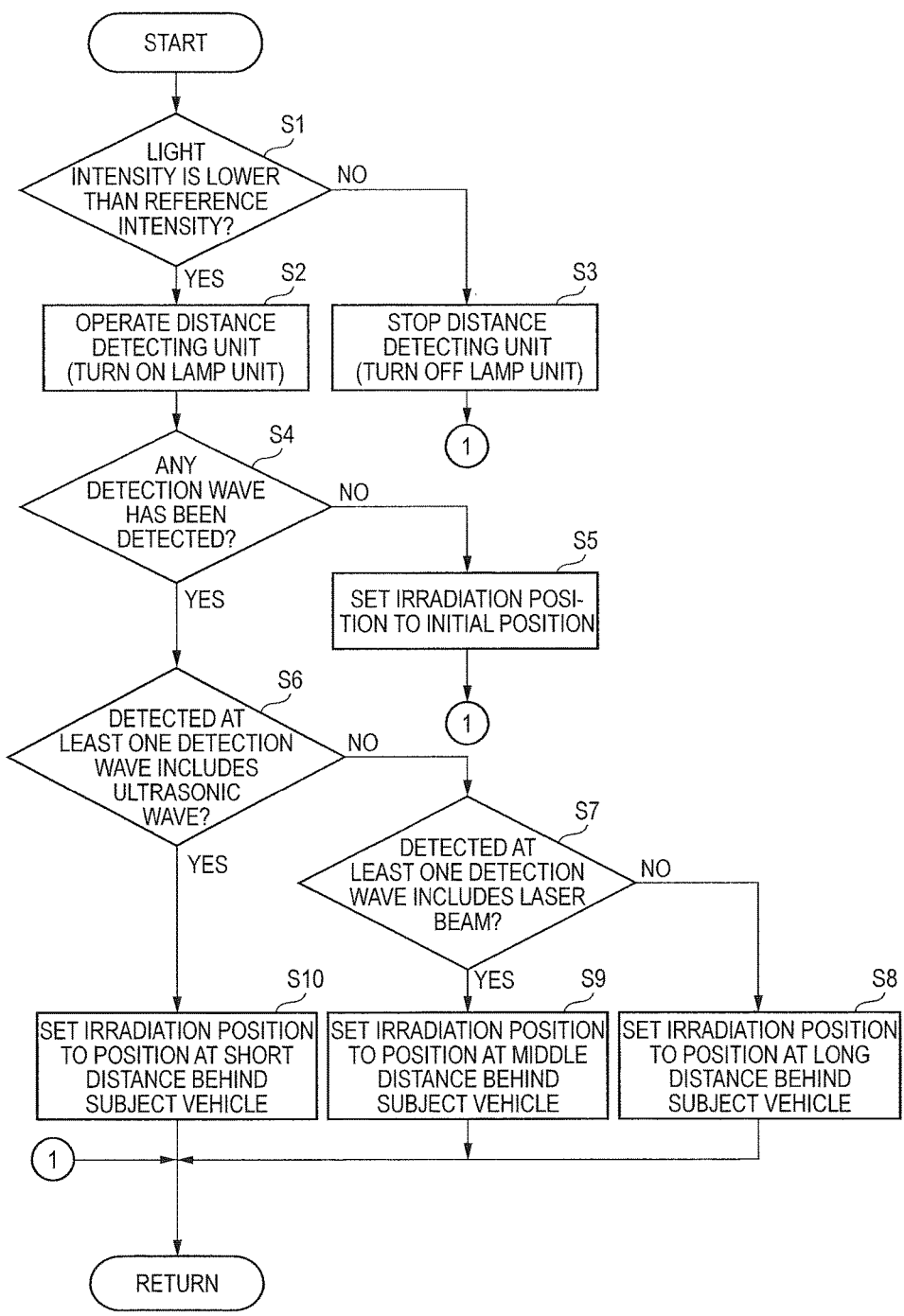
FIG. 6 is a flow chart illustrating a process of the position lighting device according to the first embodiment of the present invention.

FIG. 6 shows a process of the lighting control unit 25 of the lighting unit 15. If the power of the subject vehicle 29 is turned on, electric power is supplied to the lighting control unit 25 and the brightness/darkness detecting unit 26 of the position lighting device 11, whereby the lighting control unit 25 and the brightness/darkness detecting unit 26 start to operate. At this time, since electric power is not supplied to the ultrasonic-wave detecting unit 22, the laser beam detecting unit 23, the millimeter wave detecting unit 24, and the lamp units 16, 17, and 18, they are in a stop state.

If the lighting control unit 25 starts to operate, first, in STEP S1, it determines whether the light intensity of the circumference of the subject vehicle 29 is lower than reference intensity, on the basis of a detection signal output from the brightness/darkness detecting unit 26. In a case where the subject vehicle 29 is at a place exposed to sunlight in the daytime, the light intensity of the circumference of the subject vehicle 29 becomes equal to or higher than the reference intensity. Meanwhile, in a case where the subject vehicle 29 is at a sunless place in the daytime, or is in the nighttime, the light intensity of the circumference of the subject vehicle 29 becomes lower than the reference intensity.

In a case where the light intensity of the circumference of the subject vehicle 29 is lower than the reference intensity ("YES" in STEP S1), the lighting control unit 25 supplies electric power to the distance detecting unit 21 and the lighting unit 15, thereby operating them. As a result, in STEP S2, the ultrasonic-wave detecting unit 22, the laser beam detecting unit 23, and the millimeter wave detecting unit 24 start their detection operations, and any one of the lamp units 16, 17, and 18 is automatically turned on.

Meanwhile, in a case where the light intensity of the circumference of the subject vehicle 29 is equal to or higher than the reference intensity ("NO" in STEP S1), the lighting control unit 25 maintains the distance detecting unit 21 and the lighting unit 15 in the stop state, without supplying electric power to them. Also, in a case where electric power has been supplied to the distance detecting unit 21 and the lighting unit 15, whereby those units have operated until that time, the lighting control unit 25 interrupts supply of electric power to the distance detecting unit 21 and the lighting unit 15, thereby stopping them. As a result, in STEP S3, the detection operations of the ultrasonic-wave detecting unit 22, the laser beam detecting unit 23, and the millimeter wave detecting unit 24 stop, and among the lamp units 16, 17, and 18, a lamp which is in an ON state at that moment is automatically turned off. Thereafter, the process returns to STEP S1.

In the case where the light intensity of the circumference of the subject vehicle 29 is lower side the reference intensity, if the distance detecting unit 21 and the lighting unit 15 are operated, subsequently, in STEP S4, the lighting control unit 25 determines whether any detection wave has been detected. In a case where the other moving object 30 exist behind the subject vehicle 29, and the distance between the subject vehicle 29 and the other moving object 30 is in the very short distance section, the short-to-medium distance section or the long distance section, any one (at least the millimeter wave) of the detection waves emitted from the other moving object 30 reaches the subject vehicle 29. If at least one of the ultrasonic-wave detecting unit 22, the laser beam detecting unit 23, and the millimeter wave detecting unit 24 detects a detection wave, the at least one of the ultrasonic-wave detecting unit 22, the laser beam detecting unit 23, and the millimeter wave detecting unit 24 outputs a detection signal to the lighting control unit 25. On the basis of the at least one detection signal, the lighting control unit 25 can determine that one or more detection wave have been detected. Meanwhile, in a case where the other moving object 30 does not exist behind the subject vehicle 29, or in a case where the other moving object exists behind the subject vehicle 29 but the distance between the subject vehicle 29 and the other moving object 30 is longer than the long distance section, the detection waves emitted from the other moving object 30 do not reach the subject vehicle 29 (or even if some detection waves reach the subject vehicle 29, since they are too weak, it is impossible to clearly detect them). In this case, since all of the ultrasonic-wave detecting unit 22, the laser beam detecting unit 23, and the millimeter wave detecting unit 24 do not output any detection signal, the lighting control unit 25 can determine that any detection wave has not been detected.

In a case where any detection wave has not been detected ("NO" in STEP S4), in STEP S5, the lighting control unit 25 sets a position to be irradiated with a road irradiation beam L, to an initial position. It is possible to set the initial position to be irradiated with a road irradiation beam L, to an arbitrary position. For example, the initial position to be irradiated with a road irradiation beam L may be set to the irradiation position of a road irradiation beam L which is emitted in a case where the distance between the subject vehicle 29 and the other moving object 30 is a long distance. In this case, in STEP S5, the lighting control unit 25 turns on the lamp unit 16, and turns off the lamp units 17 and 18. Thereafter, the process returns to STEP S1.

Meanwhile, in a case where at least one detection wave has been detected ("YES" in STEP S4), subsequently, in STEP S6, the light emitting unit 12 determines whether the ultrasonic wave is included in the detected at least one detection wave. This determination can be performed on the basis of a detection signal from the ultrasonic-wave detecting unit 22. In a case where the ultrasonic wave is not included in the detected at least one detection wave ("NO" in STEP S6), subsequently, in STEP S7, the lighting control unit 25 determines whether the laser beam is included in the detected at least one detection wave. This determination can be performed on the basis of a detection signal from the laser beam detecting unit 23.

In a case where the distance between the subject vehicle 29 and the other moving object 30 is a long distance as shown in (1) of FIG. 3, the millimeter wave emitted from the other moving object 30 reaches the subject vehicle 29, but the laser beam and the ultrasonic wave emitted from the other moving object 30 do not reach the subject vehicle 29 (or even if they reach the subject vehicle 29, since they are too weak, it is impossible to clearly detect them). As a result, a detection signal is output from the millimeter wave detecting unit 24 having detected the millimeter wave; however, any detection signal is not output from the ultrasonic-wave detecting unit 22 and the laser beam detecting unit 23. On the basis of whether each of the ultrasonic-wave detecting unit 22, the laser beam detecting unit 23, the millimeter wave detecting unit 24 has output a detection signal, the lighting control unit 25 determines that both of the ultrasonic wave and the laser beam are not included in the detected at least one detection wave ("NO" in STEP S6 and "NO" in STEP S7). In this case, in STEP S8, the lighting control unit 25 sets the position to be irradiated with a road irradiation beam L, to a position on the road R at a long distance behind the subject vehicle 29. Specifically, the lighting control unit 25 turns on the lamp unit 16, and turns off the lamp units 17 and 18. Thereafter, the process returns to STEP S1.

Meanwhile, in a case where the distance between the subject vehicle 29 and the other moving object 30 is a short or middle distance as shown in (2) of FIG. 3, the millimeter wave and the laser beam emitted from the other moving object 30 reach the subject vehicle 29, but the ultrasonic wave emitted from the other moving object 30 does not reach the subject vehicle 29 (or even if it reaches the subject vehicle 29, since it is too weak, it is impossible to clearly detect it). As a result, detection signals are output from the millimeter wave detecting unit 24 and the laser beam detecting unit 23 having detected the millimeter wave and the laser beam, respectively; however, any detection signal is not output from the ultrasonic-wave detecting unit 22. On the basis of these detection signal output states, the lighting control unit 25 determines that the detected at least one detection wave does not include the ultrasonic wave but include the laser beam ("NO" in STEP S6 and "YES" in STEP S7). In this case, in STEP S9, the lighting control unit 25 sets the position to be irradiated with a road irradiation beam L, to a position on the road R at a middle distance behind the subject vehicle 29. Specifically, the lighting control unit 25 turns on the lamp unit 17, and turns off the lamp units 16 and 18. Thereafter, the process returns to STEP S1.

Meanwhile, in a case where the distance between the subject vehicle 29 and the other moving object 30 is a very short distance as shown in (3) of FIG. 3, the millimeter wave, the laser beam, and the ultrasonic wave emitted from the other moving object 30 reach the subject vehicle 29. As a result, the millimeter wave, the laser beam, and the ultrasonic wave are detected by the millimeter wave detecting unit 24, the laser beam detecting unit 23, and the ultrasonic-wave detecting unit 22, respectively, and the millimeter wave detecting unit 24, the laser beam detecting unit 23, and the ultrasonic-wave detecting unit 22 output detection signals, respectively. On the basis of these detection signal output states, the lighting control unit 25 determines that the detected at least one detection wave includes the ultrasonic wave ("YES" in STEP S6). In this case, in STEP S10, the lighting control unit 25 sets the position to be irradiated with a road irradiation beam L, to a position on the road R at a short distance behind the subject vehicle 29. Specifically, the lighting control unit 25 turns on the lamp unit 18, and turns off the lamp units 16 and 17. Thereafter, the process returns to STEP S1. The process shown in FIG. 5 is repeatedly performed while the power of the subject vehicle 29 is on.

According to this process of the lighting control unit 25, in a case where the distance between the subject vehicle 29 and the other moving object 30 is a long distance, the position to be irradiated with a road irradiation beam L becomes the position at the long distance behind the subject vehicle 29. As a result, the distance between the road irradiation beam L and the other moving object 30 becomes smaller than the distance between the subject vehicle 29 and the other moving object 30. Therefore, it is possible to prevent the reflected beam of the road irradiation beam L from the road R to enter the eyes of a driver 30A and others of the other moving object 30 from weakening. Therefore, in the case where the distance between the subject vehicle 29 and the other moving object 30 is a long distance, it is possible to make the driver 30A and others of the other moving object 30 easily, clearly, and surely recognize the existence of the subject vehicle 29 on the basis of the road irradiation beam L.

Also, according to the above-described process of the lighting control unit 25, in a case where the distance between the subject vehicle 29 and the other moving object 30 is a short or middle distance, the position to be irradiated with a road irradiation beam L becomes the position at the middle distance behind the subject vehicle 29. In other words, as the other moving object 30 approaches the subject vehicle 29, the position to be irradiated with a road irradiation beam L comes close to the subject vehicle 29. If the position to be irradiated with a road irradiation beam L is fixed to the position at the long distance behind the subject vehicle 29, as the other moving object 30 approaches the subject vehicle 29, the reflected beam of the road irradiation beam L from the road moves downward in the fields of the driver 30A and others of the other moving object 30. For this reason, it becomes difficult for the road irradiation beam L to make the driver 30A and others of the other moving object 30 recognize the existence of the subject vehicle 29. However, according to the position lighting device 11, as the other moving object 30 approaches the subject vehicle 29, the position to be irradiated with a road irradiation beam L comes close to the subject vehicle 29. Therefore, even if the other moving object 30 approaches the subject vehicle 29, the reflected beam of the road irradiation beam L from the road reach positions close to the centers of the fields of the driver 30A and others of the other moving object 30. Therefore, even in the case where the distance between the subject vehicle 29 and the other moving object 30 is a short or middle distance, it is possible to make the driver 30A and others of the other moving object 30 easily, clearly, and surely recognize the existence of the subject vehicle 29 on the basis of the road irradiation beam L.

Also, according to the above-described process of the lighting control unit 25, in the case where the distance between the subject vehicle 29 and the other moving object 30 is a very short distance, the position to be irradiated with a road irradiation beam L becomes the position at the short distance behind the subject vehicle 29. In other words, as the other moving object 30 approaches the subject vehicle 29, the position of the road irradiation beam L comes close to the subject vehicle 29. If the position to be irradiated with a road irradiation beam L is fixed to a position at a middle or long distance behind the subject vehicle 29, in the case where the other moving object 30 is very close to the subject vehicle 29, the reflected beam of the road irradiation beam L from the road may be significantly deviated downward from the centers of the fields of view of the driver 30A and others of the other moving object 30. For example, in a case where the other moving object 30 is a truck or a bus, as shown in FIG. 3, and thus the driver's seat of the other moving object 30 is at a high position, the reflected beam of the road irradiation beam L from the road completely deviate from the field of view of the driver 30A of the other moving object 30. Also, in the case where the other moving object 30 is a truck or a bus, a beam to be the road irradiation beam L may reach a portion of the front surface of the vehicle body of the other moving object 30 lower than the front glass, thereby incapable of entering the eyes of the driver 30A of the other moving object 30. For this reason, it becomes difficult to make the driver 30A and others of the other moving object 30 recognize the existence of the subject vehicle 29 on the basis of the road irradiation beam L. However, according to the position lighting device 11, as the other moving object 30 approaches the subject vehicle 29, the position of the road irradiation beam L comes close to the subject vehicle 29. Therefore, it is possible to prevent the reflected beam of the road irradiation beam L from the road from getting out of the fields of view of the driver 30A and others of the other moving object 30. Therefore, even in the case where the distance between the subject vehicle 29 and the other moving object 30 is a very short distance, it is possible make the driver 30A and others of the other moving object 30 easily, clearly, and surely recognize the existence of the subject vehicle 29 on the basis of the road irradiation beam L.

Also, in the case where the distance between the subject vehicle 29 and the other moving object 30 is a very short distance, the position lighting device 11 may emit a road irradiation beam L onto a position on the road R just below the rear of the subject vehicle 29. In this case, the reflected beam of the road irradiation beam L from the road reaches the rear of the subject vehicle 29. Therefore, the subject vehicle 29 can be brightly lit. Therefore, it is possible to make the driver 30A and others of the other moving object 30 more easily, more clearly, and more surely recognize the existence of the subject vehicle 29.

As described above, according to the position lighting device 11 of the first embodiment of the present invention, as the other moving object 30 approaches the subject vehicle 29, the position on the road R to be irradiated with a road irradiation beam L is brought close to the subject vehicle 29. Therefore, it is possible to make the other moving object 30 appropriately recognize the existence of the subject vehicle 29 on the basis of a the road irradiation beam L according to the distance between the subject vehicle 29 and the other moving object 30. Therefore, it is possible to improve the preventive safety performance of the subject vehicle 29. For example, even in a case where the subject vehicle 29 is a compact vehicle such as the motorcycle 31, it is possible to prevent the subject vehicle 29 from being missed by other moving objects.

Also, according to the position lighting device 11, the position to be irradiated with a road irradiation beam L is controlled on the basis of the type of at least one detection wave detected from the other moving object 30. Therefore, it is possible to implement control on the position to be irradiated with a road irradiation beam L according to the distance between the subject vehicle 29 and the other moving object 30, by a simple configuration. For example, it becomes unnecessary to provide a means for emitting detection waves to the position lighting device or the subject vehicle 29.

Also, according to the position lighting device 11, in the subject vehicle 29, in a case where a plurality of detection waves emitted from the other moving object 30 are detected at the same time, on the basis of one of the detection waves having the smallest detectable distance among the simultaneously detected detection waves, the position to be irradiated with a road irradiation beam is controlled. Therefore, it is possible to perform control on the position to be irradiated with a road irradiation beam L according to the distance between the subject vehicle 29 and the other moving object 30, using at least one detection wave detected from the other moving object 30, with high accuracy.

Also, according to the position lighting device 11, on the basis of the brightness of the circumference of the subject vehicle 29, each of the lamp units for emitting road irradiation beam L are automatically turn on or off (in the present embodiment, electric power for the lighting unit 15 is supplied or interrupted). Therefore, the driver of the subject vehicle 29 does not need to manually operate the position lighting device 11. Therefore, it is possible to prevent addition of the position lighting device 11 to the motorcycle 31 from increasing the driver's effort of operating the motorcycle 31.

Also, in the position lighting device 11, as shown in FIG. 2, the lamp units 16, 17, and 18 of the lighting unit 15 are disposed at positions lower than the steering handle 36 of the subject vehicle 29. Therefore, it is possible to prevent a beam emitted from the lamp units 16, 17, or 18 from directly reach an upper portion of the other moving object 30 existing behind the subject vehicle 29. Therefore, it is possible to prevent a beam emitted from the lamp units 16, 17, or 18 from directly entering the eyes of the driver and others of the other moving object.

Also, according to the position lighting device 11, as the other moving object 30 approaches the subject vehicle 29, the position on the road R to be irradiated with a road irradiation beam L is brought close to the subject vehicle 29. Therefore, it is possible to make the driver of the subject vehicle 29 surely recognize approaching of the other moving object 30 to the subject vehicle 29 on the basis of the road irradiation beam L. In other words, if the other moving object 30 approaches the subject vehicle 29, the position to be irradiated with a road irradiation beam L is brought close to the rear of the subject vehicle 29 on the road R, and thus the road irradiation beam L is reflected in the rearview mirror. Therefore, the driver of the subject vehicle 29 can surely recognize approaching of the other moving object 30.

Especially, in a case of applying the position lighting device 11 to a vehicle having a rear view display device, the usefulness of the position lighting device 11 having an effect of making the driver of the subject vehicle 29 surely recognize approaching of the other moving object 30 to the subject vehicle 29 on the basis of a road irradiation beam L increases. The rear view display device is a device for acquiring images of an area behind the vehicle and displaying the acquired images as images usable for the driver to check the area behind the vehicle during normal running. For example, in Japanese Patent Application Publication No. 2013-060128A, there is disclosed an example of the rear view display device. In a case where the subject vehicle 29 equipped with the position lighting device 11 is a vehicle having a rear view display device, if the other moving object 30 approaches the subject vehicle 29, the road irradiation beam L is imaged and the acquired image is displayed on a monitor. Therefore, on the basis of the road irradiation beam L, the driver of the subject vehicle 29 can surely recognize approaching of the other moving object 30.

Also, in the position lighting device 11 of the first embodiment described above, as an example, it has been taken the configuration in which in the lighting unit 15, the three lamp units 16, 17, and 18 are installed such that the inclination angles of their optical axes downward are different from one another, and each of the lamp units 16, 17, and 18 is switched between an ON state and an OFF state, whereby the position to be irradiated with a road irradiation beam L is changed. According to this configuration, it is possible to easily implement a configuration for changing a position to be irradiated with a road irradiation beam L. However, in place of this configuration, as shown in (3) of FIG. 4, in a lighting unit 27, one lamp unit 28 may be provided such that it possible to change a position to be irradiated with a road irradiation beam L by rotating the lamp unit 28 upward and downward. As a mean for rotating the lamp unit 28, a motor can be used. According to this configuration, it is possible to reduce the number of lamp units.

Also, in the position lighting device 11 of the first embodiment described above, a case of installing the lighting unit 15, the distance detecting unit 21, and the lighting control unit 25 in the single casing 12 has been taken as an example. However, the lighting unit 15, the distance detecting unit 21, and the lighting control unit 25 may be separately disposed at different positions of the motorcycle 31. Also, the lighting control unit 25 may be incorporated in an engine control unit (ECU) of the motorcycle 31.

Second Embodiment

Figure 7:
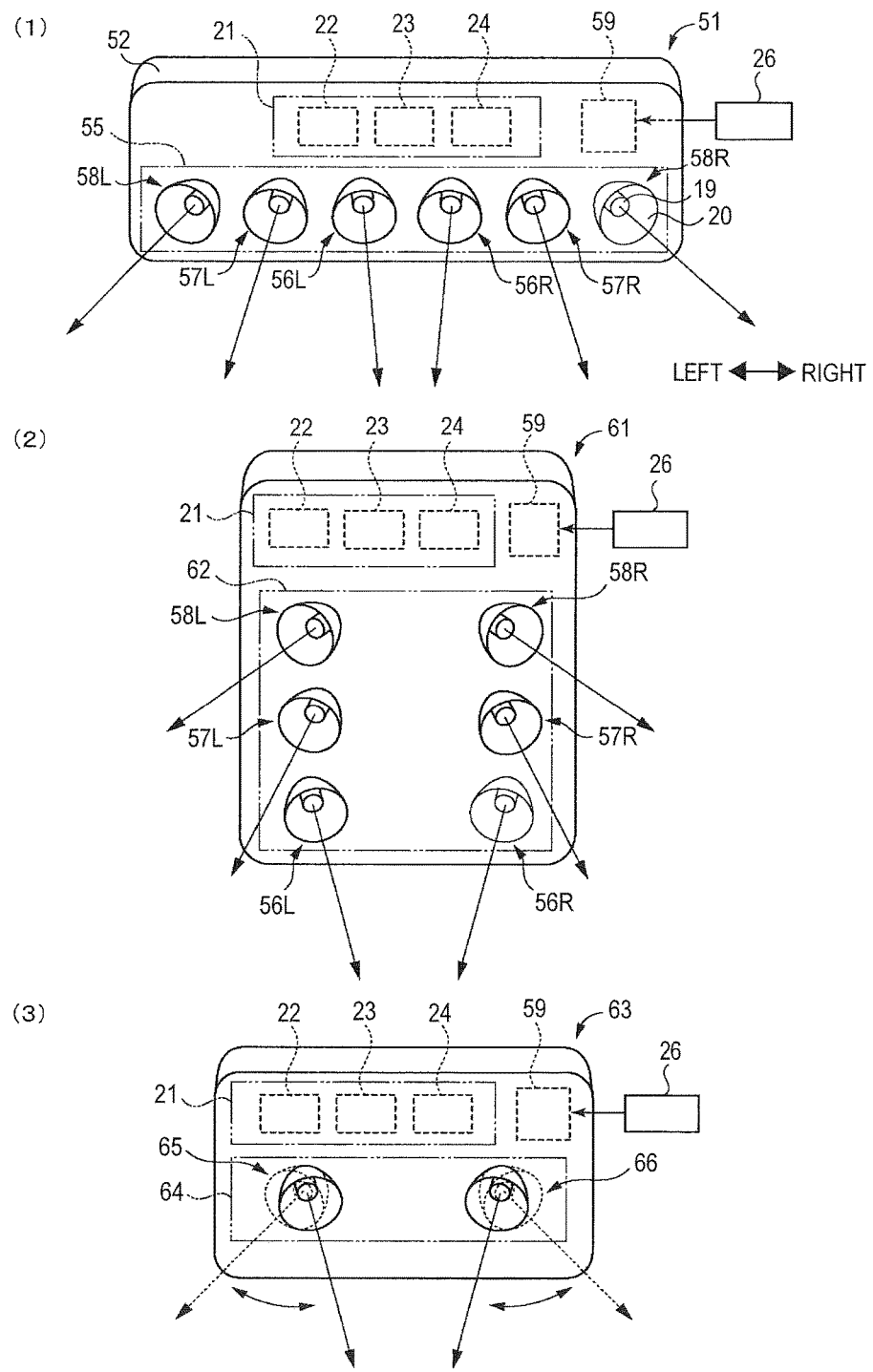
FIG. 7 is an explanatory view illustrating the configuration of a position lighting device according to a second embodiment of the present invention.

FIGS. 7 and 8 show a second embodiment of the present invention. Specifically, in FIG. 7, (1) shows the configuration of a position lighting device 51 of the second embodiment of the present invention. In FIG. 7, (2) and (3) show modifications of a lighting unit of the position lighting device of the second embodiment of the present invention, respectively. FIG. 8 shows the number, irradiation positions, and so on of road irradiation beams L which can be emitted from the position lighting device 51. Also, some components of the position lighting device 51 of the second embodiment identical to those of the position lighting device 11 of the first embodiment are denoted by the same reference symbols as those of the first embodiment, and will not be described.

The position lighting device 51 of the second embodiment of the present invention changes the irradiation positions, number, and intensity of road irradiation beams L on the road R, on the basis of the distance between the subject vehicle 29 and the other moving object 30. Similarly to the position lighting device 11 of the first embodiment, the position lighting device 51 is installed in the subject vehicle 29 (the motorcycle 31). As shown in (1) of FIG. 7, the position lighting device 51 includes a casing 52, a lighting unit 55, a distance detecting unit 21, a lighting control unit 59, and a brightness/darkness detecting unit 26. The casing 52 has a laterally long shape according to the arrangement of lamp units 56L, 56R, 57L, 57R, 58L, and 58R of the lighting control unit 59. The distance detecting unit 21 includes an ultrasonic-wave detecting unit 22, a laser beam detecting unit 23, and a millimeter wave detecting unit 24.

The lighting unit 55 includes the six lamp units 56L, 56R, 57L, 57R, 58L, and 58R. Each of the lamp units 56L, 56R, 57L, 57R, 58L, and 58R has a light source 19 and a reflector 20. The six lamp units 56L, 56R, 57L, 57R, 58L, and 58R are disposed inside the casing 52, and are arranged in a line in the right-left direction. Also, in surfaces of the casing 52 facing the rear and sides of the casing 52 facing the areas behind or at the side of the subject vehicle 29, openings (not shown in the drawings) (not shown in the drawings) are formed, and the lamp units 56L, 56R, 57L, 57R, 58L, and 58R emit beams onto positions on the road behind the subject vehicle 29, through the openings. Also, the lamp units 56L, 56R, 57L, 57R, 58L, and 58R are specific examples of light generating units.

Also, the six lamp units 56L, 56R, 57L, 57R, 58L, and 58R emit the road irradiation beams L onto a wide area on the road R behind the subject vehicle 29 in the right-left direction. Specifically, as shown in (1) of FIG. 8, the first lamp unit 56L and the second lamp unit 56R emit road irradiation beams L onto the position of the center of an area behind the subject vehicle 29 in the right-left direction (hereinafter, referred to as the "the center position behind the subject vehicle 29"). Also, as shown in (2) of FIG. 8, the third lamp unit 57L emits a road irradiation beam L onto a position slightly deviated toward the left side from the center position behind the subject vehicle 29. Also, the fourth lamp unit 57R emits a road irradiation beam L onto a position slightly deviated toward the right side from the center position behind the subject vehicle 29. Also, as shown in (3) of FIG. 8, the fifth lamp unit 58L emits a road irradiation beam L onto a position significantly deviated toward the left side from the center position behind the subject vehicle 29 (a position at the left side from the irradiation position of the road irradiation beam L from the third lamp unit 57L). Also, the sixth lamp unit 58R emits a road irradiation beam L onto a position significantly deviated toward the right side from the center position behind the subject vehicle 29 (a position at the right side from the irradiation position of the road irradiation beam L from the fourth lamp unit 57R). In other words, all of the optical axes of the six lamp units 56L, 56R, 57L, 57R, 58L, and 58R are inclined downward to the road R behind the subject vehicle 29, at a predetermined angle; however, the inclination angles of the optical axes in the right-left direction are different from one another.

Also, the irradiation positions on the road R of the road irradiation beams L from the lamp units 56L and 56R overlap each other. Also, the irradiation positions on the road R of the road irradiation beams L from the lamp units 57L and 57R are symmetric with respect to the center position behind the subject vehicle 29. Similarly, the irradiation positions on the road R of the road irradiation beams L from the lamp units 58L and 58R are also symmetric with respect to the center position behind the subject vehicle 29.

Meanwhile, the lighting control unit 59 is identical to the lighting control unit 25 according to the first embodiment, except for a process of controlling the lighting unit 55 for changing the irradiation positions, number, and intensity of road irradiation beams L. Hereinafter, the process of controlling the lighting unit 55 for changing the irradiation positions, number, and intensity of road irradiation beams L will be described.

In a case where the distance between the subject vehicle 29 and the other moving object 30 is a long distance and the detected at least one detection wave does not include the ultrasonic wave (that is, a case where the detected at least one detection wave includes only the millimeter wave), the lighting control unit 59 sets one position to be irradiated with road irradiation beams L, and sets the position to be irradiated with road irradiation beams L, to the center position behind the subject vehicle 29, and sets the intensity of road irradiation beams L to be higher than normal intensity. Specifically, the lighting control unit 59 turns on the lamp units 56L and 56R, and turns off the lamp units 57L, 57R, 58L, and 58R.

As shown in (1) of FIG. 8, the irradiation positions on the road R of the road irradiation beams L from the lamp units 56L and 56R overlap each other. Therefore, the number of road irradiation beams L which are formed on the road R by turning on the lamp units 56L and 56R at the same time is one. Also, since the beams emitted from the two lamp units 56L and 56R overlap each other, thereby forming one road irradiation beam L, the intensity of that road irradiation beam L is higher than the intensity (normal intensity) of a road irradiation beam L which is formed by a beam emitted from one lamp unit.

As described above, in the case where the distance between the subject vehicle 29 and the other moving object 30 is a long distance, the center position behind the subject vehicle 29 on the road R is lit by one road irradiation beam L. As a result, in the fields of view of the driver 30A and others of the other moving object 30, the road irradiation beam L in front of the other moving object, and the subject vehicle 29 (the motorcycle 31) in front of the road irradiation beam are arranged in a line. Therefore, it is possible to make the driver 30A and others of the other moving object 30 easily, clearly, and surely recognize the existence of the subject vehicle 29. Also, the high intensity of the road irradiation beam L makes it possible to strengthen the reflected beam of the road irradiation beam L from the road to enter the eyes of the driver 30A and others of the other moving object 30. Therefore, it is possible to improve the effect of making the driver 30A and others of the other moving object 30 easily, clearly, and surely recognize the existence of the subject vehicle 29.

Meanwhile, in a case where the distance between the subject vehicle 29 and the other moving object 30 is a short or middle distance, and thus the detected at least one detection wave does not include the ultrasonic wave but includes the laser beam, the lighting control unit 59 sets the number of road irradiation beams L to two, and sets positions to be irradiated with road irradiation beams L, to the positions slightly deviated toward the left side and right side from the center position behind the subject vehicle 29, respectively, and sets the intensity of each road irradiation beams L to the normal intensity. Specifically, the lighting control unit 59 turns on the lamp units 57L and 57R, and turns off the lamp units 56L, 56R, 58L, and 58R.

Since the irradiation positions on the road R of the road irradiation beams L from the lamp units 57L and 57R are different from each other as shown in (2) of FIG. 8, if the lamp units 57L and 57R are turned on at the same time, on the road R, two road irradiation beams L are formed, and the intensity of each road irradiation beam L becomes the normal intensity. Also, since the irradiation positions of the road irradiation beams L from the lamp units 57L and 57R are slightly deviated toward the left side and the right side from the center position behind the subject vehicle 29, respectively, the road irradiation beams L are formed in a wide area on the road R behind the subject vehicle 29 in the right-left direction.

As described above, in the case where the distance between the subject vehicle 29 and the other moving object 30 is a short or middle distance, a wide area on the road R behind the subject vehicle 29 in the right-left direction is lit by the road irradiation beams L. Therefore, it is possible to make the driver 30A and others of the other moving object 30 easily recognize the road irradiation beams L, thereby clearly and surely recognizing the subject vehicle 29 existing in front of the road irradiation beams L.

Also, in a case where the distance between the subject vehicle 29 and the other moving object 30 is a very short distance, whereby the detected at least one detection wave includes the ultrasonic wave, the lighting control unit 59 sets the number of road irradiation beams L to two, and sets positions to be irradiated with road irradiation beams L, to the positions significantly deviated toward the left side and right side from the center position behind the subject vehicle 29, respectively, and sets the intensity of each road irradiation beam L to the normal intensity. Specifically, the lighting control unit 59 turns on the lamp units 58L and 58R, and turns off the lamp units 56L, 56R, 57L, and 57R.

Since the irradiation positions on the road R of the road irradiation beams L from the lamp units 58L and 58R are different from each other as shown in (3) of FIG. 8, if the lamp units 58L and 58R are turned on at the same time, on the road R, two road irradiation beams L are formed, and the intensity of each road irradiation beam L becomes the normal intensity. Also, since the irradiation positions of the road irradiation beams L from the lamp units 57L and 57R are significantly deviated toward the left side and the right side from the center position behind the subject vehicle 29, respectively, the road irradiation beams L are formed at positions significantly deviated toward the left side and the right side from the vehicle width range of the subject vehicle 29 (the motorcycle 31), respectively. In other words, the road irradiation beams L are formed in areas significantly deviated sideward from the area where the subject vehicle 29 is running.

As described above, in the case where the distance between the subject vehicle 29 and the other moving object 30 is a very short distance, since the areas significantly deviated sideward from the area where the subject vehicle 29 is running are lit by the road irradiation beams L, it is possible to make the driver 30A and others of the other moving object 30 surely recognize the existence of the subject vehicle 29. In other words, in a case where the other moving object 30 has a driver's seat at a high position like a truck and is very close to the subject vehicle 29, the subject vehicle 29 may significantly deviate downward from the centers of the fields of view of the driver 30A and others of the other moving object 30, whereby it may difficult for the driver 30A and others of the other moving object 30 to recognize the existence of the subject vehicle 29 (the motorcycle 31 in front of the other moving object). However, even in this case, since the road irradiation beams L lighting the areas deviated sideward from the area where the subject vehicle 29 is running come into the fields of view of the driver 30A and others of the other moving object 30, on the basis of the corresponding road irradiation beams L, the driver 30A and others of the other moving object 30 can surely recognize the existence of the subject vehicle 29.

As described above, even according to the position lighting device 51 of the second embodiment of the present invention, it is possible to make the other moving object 30 appropriately recognize the existence of the subject vehicle 29 on the basis of road irradiation beams L according to the distance between the subject vehicle 29 and the other moving object 30. Also, even according to the position lighting device 51 of the second embodiment of the present invention, similarly in the position lighting device 11 of the first embodiment, it is possible to make the driver of the subject vehicle 29 surely recognize approaching of the other moving object 30 to the subject vehicle 29 on the basis of road irradiation beams L.

Also, in the position lighting device 51 of the second embodiment described above, the case where the six lamp units 56L, 56R, 57L, 57R, 58L, and 58R of the lighting unit 55 are arranged in a line in the right-left direction as shown in (1) of FIG. 7 has been taken as an example. However, in place of this arrangement, like in a lighting unit 62 of a position lighting device 61 shown in (2) of FIG. 7, the six lamp units 56L, 56R, 57L, 57R, 58L, and 58R may be arranged in two lines in the vertical direction. Also, like a lighting unit 64 of a position lighting device 63 shown in (3) of FIG. 1, it is possible to arrange two lamp units 65 and 66, side by side, in the right-left direction, and rotate the lamp units 65 and 66 in the right-left direction by motors or the like.

Also, the position lighting device 51 of the second embodiment of the present invention described above may have the following configuration. Specifically, the position lighting device 51 detects the distance between the subject vehicle 29 and the other moving object running behind the subject vehicle 29 on the same lane as the lane where the subject vehicle 29 is running, the distance between the subject vehicle 29 and the other moving object running behind the subject vehicle 29 on a lane neighboring to the left side of the lane where the subject vehicle 29 is running, and the distance between the subject vehicle 29 and the other moving object running behind the subject vehicle 29 on a lane neighboring to the right side of the lane where the subject vehicle 29 is running, such that those distance are identifiable. Then, if the distance between the subject vehicle 29 and the other moving object running behind the subject vehicle 29 on the same lane as the lane where the subject vehicle 29 is running becomes a very short distance, the position lighting device emits a road irradiation beam L onto a position behind the subject vehicle 29 on the road R of the lane where the subject vehicle 29 is running. Also, if the distance between the subject vehicle 29 and the other moving object running behind the subject vehicle 29 on the lane neighboring to the left side of the lane where the subject vehicle 29 is running is a very short distance, the position lighting device emits a road irradiation beam L onto a position on the left side from the subject vehicle 29 or a position behind the left side from the subject vehicle 29 on the road R of the lane where the subject vehicle 29 is running. Also, if the distance between the subject vehicle 29 and the other moving object running behind the subject vehicle 29 on the lane neighboring to the right side of the lane where the subject vehicle 29 is running becomes a very short distance, the position lighting device 51 emits a road irradiation beam L onto a position on the right side from the subject vehicle 29 or a position behind the right side from the subject vehicle 29 on the road R of the lane where the subject vehicle 29 is running. According to this configuration, it is possible to make even the other moving objects running on the lanes neighboring to the left side and the right side of the lane where the subject vehicle 29 is running easily, clearly, and surely recognize the existence of the subject vehicle 29.

Third Embodiment

FIG. 9 shows a third embodiment of the present invention. A position lighting device 71 of the third embodiment of the present invention changes the shape of a road irradiation beam L on the road R on the basis of the distance between the subject vehicle 29 and the other moving object 30. Specifically, in a case where the distance between the subject vehicle 29 and the other moving object 30 is large, the position lighting device sets the shape of the road irradiation beam L on the road R to be elongated in the longitudinal direction. Meanwhile, in a case where the distance between the subject vehicle 29 and the other moving object 30 is small, the position lighting device sets the shape of the road irradiation beam L on the road R to be elongated in the lateral direction. For example, in a case where the distance between the subject vehicle 29 and the other moving object 30 is a long distance, the position lighting device sets the shape of the road irradiation beam L on the road R to be elongated in the longitudinal direction. Meanwhile, in a case where the distance between the subject vehicle 29 and the other moving object 30 is a short or middle distance, or a very short distance, the position lighting device sets the shape of the road irradiation beam L on the road R to be elongated in the lateral direction.

In the case where the distance between the subject vehicle 29 and the other moving object 30 is large, the distance between the road irradiation beam L formed on the road R and the other moving object 30 is long. In this case, the incident angles of the fields of view of the driver 30A and others of the other moving object 30 to the road irradiation beam L formed on the road R are small. As a result, in the fields of view of the driver 30A and others of the other moving object 30, the shape of the reflected beam of the road irradiation beam L from the road becomes a shape reduced in size in the vertical direction. Therefore, if the shape of the road irradiation beam L is, for example, a shape close to an exact circle, the size of the reflected beam of the road irradiation beam L from the road in the fields of view of the driver 30A and others of the other moving object 30 becomes too small, it becomes difficult for the driver 30A and others of the other moving object 30 to recognize the road irradiation beam L. However, according to the position lighting device 71 of the third embodiment of the present invention, in the case where the distance between the subject vehicle 29 and the other moving object 30 is large, the position lighting device sets the shape of the road irradiation beam L to be elongated in the longitudinal direction. Therefore, even if the reflected beam of the road irradiation beam L from the road R coming into the fields of view of the driver 30A and others of the other moving object 30 is reduced in size in the vertical direction, the size of the reflected beam of the corresponding road irradiation beam L is not significantly reduced. Therefore, the driver 30A and others of the other moving object 30 can clearly recognize the road irradiation beam L.

Meanwhile, in a case where the distance between the subject vehicle 29 and the other moving object 30 is small, the distance between the road irradiation beam L formed on the road R and the other moving object 30 is small. In this case, the reflected beam of the road irradiation beam L from the road R is deviated downward from the centers of the fields of view of the driver 30A and others of the other moving object 30, and thus it is difficult for the driver 30A and others of the other moving object 30 to recognize the road irradiation beam L. However, according to the position lighting device 71 of the third embodiment of the present invention, in the case where the distance between the subject vehicle 29 and the other moving object 30 is small, the position lighting device sets the shape of the road irradiation beam L to be elongated in the lateral direction. As a result, the reflected beam of the road irradiation beam L from the road R comes into the fields of view of the driver 30A and others of the other moving object 30 even from the left side and the right side. Therefore, the driver 30A and others of the other moving object 30 can easily and surely recognize the road irradiation beam L.

As described above, even according to the position lighting device 71 of the third embodiment of the present invention, it is possible to make the driver 30A and others of the other moving object 30 easily, clearly, and surely recognize the existence of the subject vehicle 29 on the basis of the road irradiation beam L. Also, even according to the position lighting device 71 of the third embodiment of the present invention, similarly in the position lighting device 11 of the first embodiment, it is possible to make the driver of the subject vehicle 29 clearly recognize approaching of the other moving object 30 to the subject vehicle 29 on the basis of the road irradiation beam L.

Fourth Embodiment

FIG. 10 shows a fourth embodiment of the present invention. A position lighting device 81 of the fourth embodiment of the present invention swings a road irradiation beam L on the road R. Further, the position lighting device 81 changes the swinging speed of the road irradiation beam L on the basis of the distance between the subject vehicle 29 and the other moving object 30. For example, as the other moving object 30 approaches the subject vehicle 29, the position lighting device 81 increases the swinging speed of the road irradiation beam L. More specifically, in a case where the distance between the subject vehicle 29 and the other moving object 30 is a long distance, the position lighting device sets the swinging speed of the road irradiation beam L to a first speed which is the lowest. Also, in a case where the distance between the subject vehicle 29 and the other moving object 30 is a short or middle distance, the position lighting device sets the swinging speed of the road irradiation beam L to a second speed higher than the first speed. Also, in a case where the distance between the subject vehicle 29 and the other moving object 30 is a very short distance, the position lighting device sets the swinging speed of the road irradiation beam L to a third speed higher than the second speed.

The position lighting device 81 includes a lighting unit, which includes, for example, one lamp unit, a motor, and a power conversion mechanism for swinging the lamp unit in the right-left direction, using the torque of the motor. Also, the position lighting device 11 includes a lighting control unit which changes the rotation speed of the motor on the basis of the distance between the subject vehicle 29 and the other moving object 30.

Even according to this position lighting device 81, it is possible to make the driver 30A and others of the other moving object 30 easily, clearly, and surely recognize the existence of the subject vehicle 29 on the basis of the road irradiation beam L. Also, it is possible to make the driver of the subject vehicle 29 clearly recognize approaching of the other moving object 30 to the subject vehicle 29 on the basis of the road irradiation beam L.

Fifth Embodiment

Figure 11:
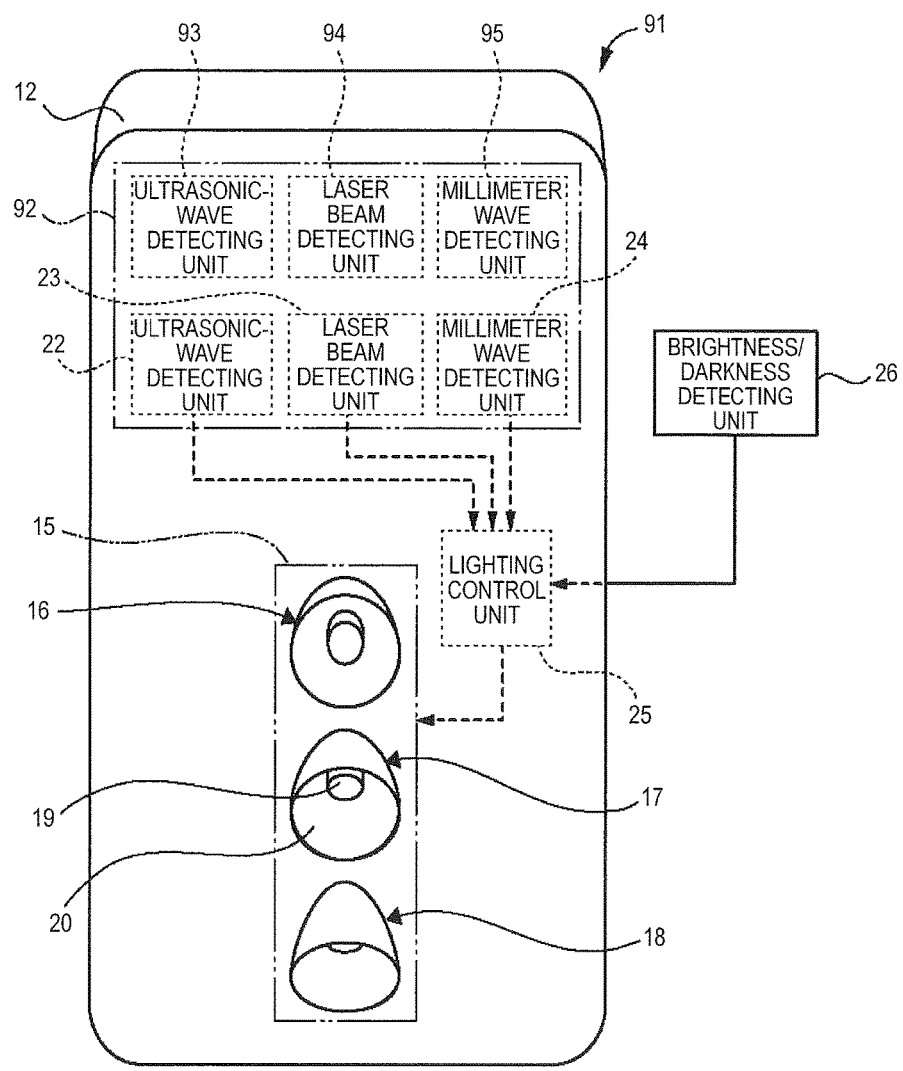
FIG. 11 is an explanatory view illustrating the configuration of a position lighting device according to a fifth embodiment of the present invention.

FIG. 11 shows a fifth embodiment of the present invention. A position lighting device 91 of the fifth embodiment of the present invention detects the distance between the subject vehicle 29 and the other moving object 30 by emitting detection waves from the position lighting device 91 and performing detection on the reflected waves of those detection waves from the other moving object 30. Specifically, as shown in FIG. 11, the position lighting device 91 includes a distance detecting unit 92 which includes an ultrasonic-wave generating unit 93, a laser beam generating unit 94, and a millimeter wave generating unit 95, in addition to an ultrasonic-wave detecting unit 22, a laser beam detecting unit 23, and a millimeter wave detecting unit 24. Similarly to the position lighting device 11 of the first embodiment, the position lighting device 91 is installed at the rear of the subject vehicle 29 (the motorcycle 31).

The ultrasonic-wave generating unit 93 emits an ultrasonic wave toward the area behind the subject vehicle 29. In a case where the other moving object exists at a very short distance behind the subject vehicle 29, the ultrasonic wave emitted from the ultrasonic-wave generating unit 93 reaches the corresponding other moving object 30, and the reflected wave of the ultrasonic wave from the corresponding other moving object 30 is detected by the ultrasonic-wave detecting unit 22.

The laser beam generating unit 94 emits a laser beam toward the area behind the subject vehicle 29. In a case where the other moving object 30 exists at a short or middle distance behind the subject vehicle 29, the laser beam emitted from the laser beam generating unit 94 reaches the corresponding other moving object 30, and the reflected wave of the laser beam from the corresponding other moving object 30 is detected by the laser beam detecting unit 23.

The millimeter wave generating unit 95 emits a millimeter wave toward the area behind the subject vehicle 29. In a case where the other moving object 30 exists at a long distance behind the subject vehicle 29, the ultrasonic wave emitted from the millimeter wave generating unit 95 reaches the corresponding other moving object 30, and the reflected wave of the millimeter wave from the corresponding other moving object 30 is detected by the millimeter wave detecting unit 24.

The other configuration and operation of the position lighting device 91 are the same as those of the position lighting device 11.

Even according to the position lighting device 91, it is possible to make the driver 30A and others of the other moving object 30 easily, clearly, and surely recognize the existence of the subject vehicle 29 on the basis of the road irradiation beam L. Also, it is possible to make the driver of the subject vehicle 29 clearly recognize approaching of the other moving object 30 to the subject vehicle 29 on the basis of the road irradiation beam L.

Further, according to the position lighting device 91, since the position lighting device emits the ultrasonic wave, the laser beam, and the millimeter wave, even in a case where the other moving object 30 does not have devices for emitting an ultrasonic wave, a laser beam or a millimeter wave, it is possible to detect the distance between the subject vehicle 29 and the other moving object 30, and it is possible to change the shape of the road irradiation beam L on the basis of the detected distance.

Sixth Embodiment

FIG. 12 shows a sixth embodiment of the present invention. The sixth embodiment of the present invention is an example in which a position lighting device of the present invention is applied to a bicycle. As shown in FIG. 12, a position lighting device 101 is attached to the rear of a bicycle 102, for example, to a rear fender 103. However, the position lighting device 101 may be attached to a rear rack 104 of the bicycle 102. Also, it is preferable to dispose the position lighting device 101 such that a lighting unit included in the position lighting device is disposed at a position lower than a steering handle 105.

Also, the position lighting device 101 shown in FIG. 12 is a type of position lighting device for swinging a road irradiation beam L on the road R and changing the shape of the road irradiation beam L on the basis of the distance between a subject vehicle and the other moving object, similarly to the position lighting device 81 of the fourth embodiment. However, in place of this type of position lighting device, any one of the position lighting devices 11, 51, 71, and 91 of the first, second, third, and fifth embodiments described above may be installed on the bicycle 102. Also, in a case where the bicycle 102 is a bicycle with an electric motor, as the power source of the position lighting device 101, a battery installed on the bicycle 102 is used. In a case where the bicycle 102 is a normal bicycle, as the power source of the position lighting device 101, a battery is installed.

According to the sixth embodiment of the present invention, it is possible to make other moving objects easily, clearly, and surely recognize the existence of the bicycle 102 on the basis of the road irradiation beam L, and it is possible to improve the preventive safety performance of the bicycle 102. Also, it is possible to make a driver of the bicycle 102 surely recognize approaching of the other moving objects 30 to the bicycle 102 on the basis of the road irradiation beam L.

Seventh Embodiment

FIG. 13 shows a seventh embodiment of the present invention. The seventh embodiment of the present invention is an example in which a position lighting device of the present invention is applied to a welfare-purpose electric one-seater vehicle which is a transport means for the aged and so on. As shown in FIG. 13, a welfare-purpose electric vehicle 115 includes a pair of right and left front wheels 116, a pair of right and left rear wheels 117, a handle 118, a seat 119 with a backrest, a rear cowl 120, and so on. Also, inside the rear cowl 120, a motor for running, a battery for driving the motor for running, and so on are installed. A position lighting device 111 is attached to the rear of the welfare-purpose electric vehicle 115. Specifically, the position lighting device 111 has a configuration in which a lighting unit 113 is separated from a main device body 112 including a distance detecting unit and a lighting control unit. The main device body 112 and the lighting unit 113 are electrically connected to each other by cables or the like. Further, the main device body 112 is attached to the rear of the rear cowl 120 of the welfare-purpose electric vehicle 115. Also, the lighting unit 113 is attached to a portion of the rear surface of the backrest of the seat 119 lower than the handle 118.

Also, the position lighting device 111 shown in FIG. 13 is a type of position lighting device for swinging a road irradiation beam L on the road R and changing the swinging speed of the road irradiation beam L on the basis of the distance between a subject vehicle and the other moving object, similarly to the position lighting device 81 of the fourth embodiment. However, in place of this type of position lighting device, any one of the position lighting devices 11, 51, 71, and 91 of the first, second, third, and fifth embodiments described above may be installed on the welfare-purpose electric vehicle 115.

According to the seventh embodiment of the present invention, it is possible to make other moving objects easily, clearly, and surely recognize the existence of the welfare-purpose electric vehicle 115 on the basis of the road irradiation beam L, and it is possible to improve the preventive safety performance of the welfare-purpose electric vehicle 115. Also, it is possible to make a driver of the welfare-purpose electric vehicle 115 surely recognize approaching of the other moving objects 30 to the welfare-purpose electric vehicle 115 on the basis of the road irradiation beam L.

Also, the position lighting devices of the present invention can be applied to other electric vehicles such as a golf cart and a shopping cart.

Also, besides the embodiments of the position lighting devices of the present invention described above, there are the following embodiments. Specifically, a position lighting device may make a light unit for emitting a road irradiation beam blink and change the blinking rate on the basis of the distance between a subject vehicle and the other moving object. For example, in a case where the distance between the subject vehicle and the other moving object is large, the position lighting device sets the blinking rate of the road irradiation beam to be low, and in a case where the distance between the subject vehicle and the other moving object is small, the position lighting device sets the blinking rate of the road irradiation beam to be high.

Also, a position lighting device may change the color of a road irradiation beam on the basis of the distance between a subject vehicle and the other moving object. For example, in a case where the distance between the subject vehicle and the other moving object is large, the position lighting device sets the color of the road irradiation beam to white, and in a case where the distance between the subject vehicle and the other moving object is large, the position lighting device sets the color of the road irradiation beam to red. Also, a position lighting device may change the size (irradiation range) of the road irradiation beam on the road, on the basis of the distance between the subject vehicle and the other moving object.

Also, the position lighting device may change the state of a road irradiation beam, for example, two types of detection waves of a laser beam ad a millimeter wave, or may change the state of a road irradiation beam on the basis of four or more detection waves.

Also, in a position lighting device, the number of lamp units for forming road irradiation beams is not limited. Also, in a case of setting a plurality of positions on the road to be irradiated with beams from a plurality of lamp units, instead of providing light sources to the lamp units, respectively, beams emitted from less light sources may be dispersed by reflectors and light guiding pipes.

Also, the present invention can be appropriately modified without departing from the gist and idea of the invention which can be read from claims and the entire specification, and position lighting devices according to those modifications are also included in the technical idea of the present invention.

What is claimed is:

1. A position lighting device configured to emit at least one road irradiation beam from a vehicle onto a road, thereby making the other moving object which is positioned behind the vehicle or at a side of the vehicle recognize an existence of the vehicle, the position lighting device comprising:
    a lighting unit configured to emit the at least one road irradiation beam onto at least a portion of areas on the road behind and at the side of the vehicle;
    a distance detecting unit configured to detect a distance between the vehicle and the other moving object; and
    a lighting control unit configured to control the lighting unit on the basis of the distance between the vehicle and the other moving object detected by the distance detecting unit, thereby changing a state of the at least one road irradiation beam,
    wherein the distance detecting unit is configured to detect a plurality of types of a plurality of detection waves emitted from the other moving object, and on the basis of a type of at least one of the detection waves detected by the distance detecting unit, the lighting control unit changes the state of the at least one road irradiation beam.

2. The position lighting device according to claim 1, wherein on the basis of the distance between the vehicle and the other moving object, the lighting control unit changes at least one of a position, an irradiation range, a size, a shape, a number, an intensity, and a color of the at least one road irradiation beam on the road.

3. The position lighting device according to claim 1, wherein when the vehicle and the other moving object come close to each other, the lighting control unit brings the position of the at least one road irradiation beam on the road close to the vehicle.

4. The position lighting device according to claim 1, wherein in a case where the distance detecting unit detects the plurality of detection waves emitted from the other moving object at the same time, on the basis of one of the detection waves having the smallest detectable distance among the plurality of detection waves detected at the same time, the lighting control unit changes the state of the at least one road irradiation beam.

5. The position lighting device according to claim 1, wherein in a case where the distance between the vehicle and the other moving object is relatively large, the lighting control unit sets the shape of the at least one road irradiation beam on the road to be elongated in a longitudinal direction of the road, and in a case where the distance between the vehicle and the other moving object is relatively small, the lighting control unit sets the shape of the at least one road irradiation beam on the road to be elongated in a lateral direction of the road.

6. The position lighting device according to claim 1, wherein the lighting unit includes a plurality of light generating units configured to emit beams, and wherein in a case where the distance between the vehicle and the other moving object is relatively large, the lighting control unit performs a control of overlapping the beams emitted from the plurality of light generating units with each other, thereby forming one road irradiation beam, and in a case where the distance between the vehicle and the other moving object is relatively small, the lighting control unit performs a control of separating the beams emitted from the plurality of light generating units from each other, thereby forming a plurality of road irradiation beams.

7. The position lighting device according to claim 1, wherein on the basis of the distance between the vehicle and the other moving object, the lighting control unit changes a swinging speed or a blinking rate of the at least one road irradiation beam.

8. The position lighting device according to claim 1, further comprising a lamp control unit configured to detect a brightness of a circumference of the vehicle, and switch the at least one road irradiation beam between an ON state and an OFF state, on the basis of the detected brightness.

9. The position lighting device according to claim 1, wherein the vehicle is configured to acquire images of the area behind the vehicle and comprised of a rear view display for displaying the acquired images as images usable for a driver to check the area behind the vehicle during normal running.

10. The position lighting device according to claim 1, wherein the lighting unit is disposed at a position of the vehicle lower than a steering handle.

11. The position lighting device according to claim 1, wherein the vehicle is one of a saddle-ridden type vehicle, a welfare-purpose electric vehicle, and a bicycle.

12. A position lighting device configured to emit at least one road irradiation beam from a vehicle onto a road, thereby making the other moving object which is positioned behind the vehicle or at a side of the vehicle recognize an existence of the vehicle, the position lighting device comprising:

a lighting unit configured to emit the at least one road irradiation beam onto at least a portion of areas on the road behind and at the side of the vehicle;

a distance detecting unit configured to detect a distance between the vehicle and the other moving object; and a lighting control unit configured to control the lighting unit on the basis of the distance between the vehicle and the other moving object detected by the distance detecting unit, thereby changing a state of the at least one road irradiation beam wherein the lighting unit includes a plurality of light generating units configured to emit beams, and wherein in a case where the distance between the vehicle and the other moving object is relatively large, the lighting control unit performs a control of overlapping the beams emitted from the plurality of light generating units with each other, thereby forming one road irradiation beam, and in a case where the distance between the vehicle and the other moving object is relatively small, the lighting control unit performs a control of separating the beams emitted from the plurality of light generating units from each other, thereby forming a plurality of road irradiation beams.

* * * * *